United States Patent
Han et al.

(10) Patent No.: US 7,676,226 B2
(45) Date of Patent: Mar. 9, 2010

(54) FAST HANDOVER METHOD OPTIMIZED FOR IEEE 802.11 NETWORKS

(75) Inventors: Youn-hee Han, Yongin-si (KR); Hee-jin Jang, Yongin-si (KR); Choong-hun Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1331 days.

(21) Appl. No.: 11/130,250

(22) Filed: May 17, 2005

(65) Prior Publication Data

US 2005/0255847 A1    Nov. 17, 2005

(30) Foreign Application Priority Data

May 17, 2004  (KR) .................. 10-2004-0034958
May 10, 2005  (KR) .................. 10-2005-0038890

(51) Int. Cl.
*H04W 36/00* (2006.01)

(52) U.S. Cl. .................. 455/436; 455/442; 455/525

(58) Field of Classification Search .................. 455/457, 455/456.1–456.6, 436–438, 442–444, 524–525
See application file for complete search history.

(56) References Cited

U.S. PATENT DOCUMENTS 5,267,261 A    11/1993   Blakeney et al.

FOREIGN PATENT DOCUMENTS

| EP | 1 418 711 | 5/2004 |
|---|---|---|
| EP | 1 458 209 | 9/2004 |
| KR | 2001-32466 | 4/2001 |
| KR | 2003-95139 | 12/2003 |
| WO | WO 96/16524 | 5/1996 |
| WO | WO 97/06648 | 2/1997 |

OTHER PUBLICATIONS

Office action issued in Korean Patent Application No. 2005-38890 on May 26, 2006.
Office Action issued on May 11, 2007 by the Chinese Intellectual Property Office for Chinese Patent Application No. 200510079203.5.
Search Report issued in European Patent Application No. 05010675.6 on Dec. 4, 2008.

*Primary Examiner*—Melur Ramakrishnaiah
(74) *Attorney, Agent, or Firm*—NSIP Law

(57) ABSTRACT

A fast handover method optimized for IEEE 802.11 networks. In a wireless local area system including a mobile terminal and at least two wireless access points (APs) that communicate with the mobile terminal over a unique radio channel, the fast handover method includes receiving a beacon frame signal from the serving AP and the neighbor APs of the mobile terminal; generating a first signal to determine a state of each of the neighbor APs based on the beacon frame signal received from each of the neighbor APs; comparing the first signal with predefined thresholds, classifying the neighbor APs into a detected AP, a candidate AP, and a target AP according to a result of the comparison, and storing the classification result in a neighbor AP list; and selecting an AP for the handover based on the classification result in the neighbor AP list.

79 Claims, 16 Drawing Sheets

K=0.9

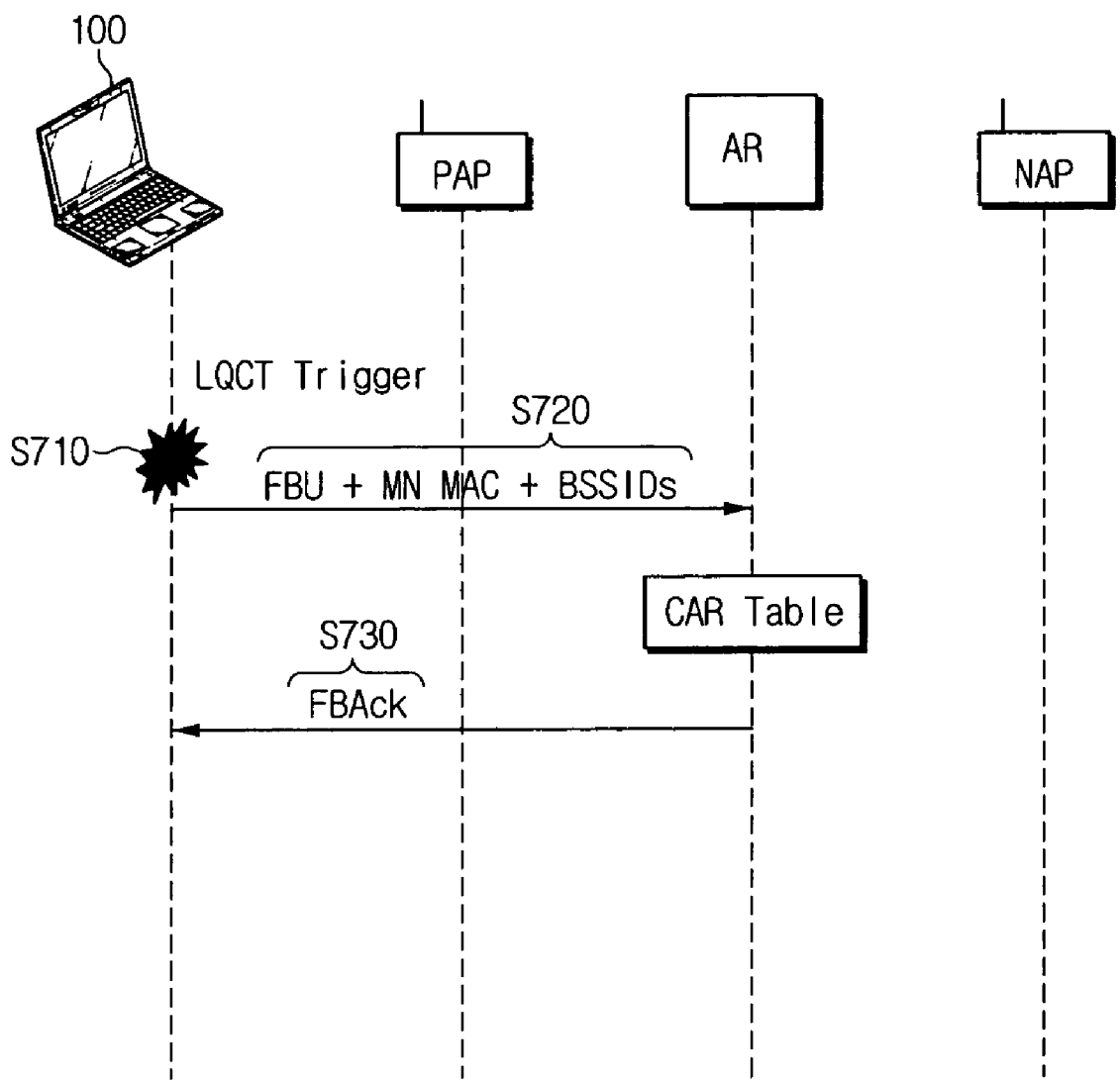

FAST HANDOVER METHOD OPTIMIZED FOR IEEE 802.11 NETWORKS

CROSS-REFERENCE TO RELATED APPLICATIONS

This application claims the benefit of Korean Application No. 2004-34958, filed May 17, 2004, and Korean Application No. 2005-38890, filed May 10, 2005, in the Korean Intellectual Property Office, the disclosures of which are incorporated herein by reference.

BACKGROUND OF THE INVENTION

1. Field of the Invention

The present invention relates generally to a fast handover method. More specifically, the present invention relates to a fast handover method optimized for the Institute of Electrical and Electronics Engineers (IEEE) 802.11 networks which support a node being fast handed over through a pre-operation for the fast handover.

2. Description of the Related Art

Recently, with the rapidly increasing use of the Internet, the development of radio communication technology, and the improvement of performance of mobile terminals such as portable computers and personal digital assistants (PDAs), a great number of users use wireless Internet. Under a wireless Internet environment, the mobile terminal occasionally changes a network attachment point due to a movement of a location of the mobile terminal.

In order for the mobile terminal to perform wireless Internet communications, even when the mobile terminal moves into a foreign network out of its home network, a similarly high quality Internet service as that of the home network should be assured. As for the mobile terminal changing a network attachment point, a variety of technologies have been proposed to provide stable wireless Internet services. In particular, the mobile IP working group of the Internet Engineering Task Force (IETF) has proposed a method by which all mobile terminals may continuously use a specific identifier, referred to as an IP address, regardless of the network attachment point. The mobile IP working group defines a mobile IP protocol and tries to complement defects. Also, in order to overcome a problem in which the existing IPv4 address system cannot accept increasing demand for more addresses, the introduction of mobile IPv6 technology is underway to provide wireless Internet service using the IPv6. Since the mobile IPv6 has been introduced, this system has been revised to become IETF Internet-draft version 24 and plans are underway for the system to become a Request For Comments (RFC) system.

In accordance with the mobile IPv6 technology, even when a mobile terminal moves into a foreign network, the mobile terminal remains in communication with a correspondent node (CN) using a home address (HA) thereof via a home agent (HA). The HA is a router having registration information of the mobile terminal. When the mobile terminal is linked to the foreign network, the mobile terminal is assigned a care-of Address (CoA), which is a temporary address, from an access router of the foreign network, and registers the assigned CoA along with the home address at the home agent, which is called a binding.

Accordingly, the home agent intercepts packets from the correspondent node to the mobile terminal, and forwards the intercepted packets to the mobile terminal located at the foreign network using a current CoA of the mobile terminal.

In order to be assigned a CoA, the mobile terminal establishes a link layer connection to the foreign network, and then receives a router advertisement (RA) message from a router of the foreign network. To this end, the mobile terminal may multicast a router solicitation message to the entire network.

The router advertisement message provides prefix information of the network. Accordingly, the mobile terminal generates a new CoA using the prefix information of the network and a link-layer address (LLA) thereof. The mobile terminal sets the generated CoA to the temporary address thereof.

When determining whether the CoA is generated according to the movement of the mobile terminal to another network or the re-set of the network interface of the mobile terminal is impossible, a delay should be carried out over a time between 0 and 1 second.

Next, the mobile terminal multicasts a neighbor solicitation message including its LLA to the newly linked network, and commences a duplicate address detection (hereinafter, to be referred to as DAD).

If the neighbor advertisement informing that the duplicate address is not received at the mobile terminal within a predetermined time limit (RetransTimer), the corresponding CoA is regarded as a unique CoA and the mobile terminal performs communications using this unique CoA over the network. The predetermined time limit is 1000 ms by default.

According to the mobile IPv6 standard, when the mobile terminal gets a new link, that is, when the mobile terminal moves into a new IP subnet, a fast handover in mobile IPv6 (FMIPv6) has been proposed as a protocol to minimize handoff latency and packet loss, which is planned to become an RFC in time.

However, the FMIPv6, which uses a lot of handover-related signalings, has considerable problems. In particular, the FMIPv6 is in the standardization process without being optimized for the IEEE 802.1x network. The following explains the problems of the conventional fast IPv6 handover method.

First, that the conventional fast IPv6 handover is carried out in a preactive mode based on movement prediction is assumed. However, it is not clearly specified when the mobile terminal goes through layer 2 handover when the movement prediction is successful at the link before the movement. Thus, packet loss may happen when the layer 2 handover is not correctly performed after a packet tunneling request message is sent to the layer 3.

The movement prediction is divided roughly into movement detection, and new CoA configuration and confirmation. As the conventional fast IPv6 handover carries out the two processes separately, a pre-operation for the handover requires quite a long time and chance of the successful handover based on the prediction lowers.

For the mobile terminal to check the address duplication when generating a temporary address thereof to be used at the new link takes approximately 1000 ms. Such a required time raises the most serious problem to the fast handover.

SUMMARY OF THE INVENTION

An aspect of the present invention solves the above-mentioned and/or other problems and disadvantages occurring in the conventional arrangement. An aspect of the present invention provides a fast handover method optimized for the IEEE 802.11 networks so as to enable a mobile terminal adopting Internet protocol version 6 (IPv6) as a basic stack of a network layer, to be provided with fast IPv6 handover service.

To achieve the above aspect and/or features of the present invention, a fast handover method for a mobile terminal in a wireless local area system including the mobile terminal and at least two wireless access points (APs) that communicate with the mobile terminal over a unique radio channel, includes receiving a beacon frame signal from the serving AP and the neighbor APs of the mobile terminal; generating a first signal to determine a state of each of the neighbor APs based on the beacon frame signal received from each of the neighbor APs; comparing the first signal with predefined thresholds, classifying the neighbor APs into a detected AP, a candidate AP, and a target AP according to a result of the comparison, and storing the classification result in a neighbor AP list; and selecting an AP for the handover based on the classification result in the neighbor AP list.

A handover ready phase may commence when a strength of a first signal detected from the serving AP falls below the first threshold THR_1.

The handover ready phase may be divided into a case when the serving AP currently communicating with the mobile terminal and the neighbor AP that establishes new communications with the mobile terminal belong to different subnetworks, and a case when the serving AP currently communicating with the mobile terminal and the neighbor AP that establishes new communications with the mobile terminal belong to the same subnetwork.

The handover ready phase may include (a) transmitting Link_Quality_Crosses_Threshold (LQCT) Trigger information from a layer 2 to a layer 3; (b) selecting a candidate AP and a target AP that are the neighbor APs capable of establishing new communications with the mobile terminal from the neighbor AP list, and retrieving information relating to the selected candidate AP and target AP; (c) transmitting a media access control (MAC) address of the mobile terminal, basic service set identifiers (BSSIDs) of the candidate APs and the target AP, and a fast binding update (FBU) message from the mobile terminal to an access router that manages the subnetwork the mobile terminal belongs to when the neighbor AP capable of establishing new communications with the mobile terminal and the serving AP currently communicating with the mobile terminal belong to different subnetworks according to the information retrieval; (d) transmitting a handover initiation (HI) message and the MAC address of the mobile terminal from the access router that manages the subnetwork of the mobile terminal, to routers connected to the candidate APs and the target AP, respectively; (e) transmitting a HAck message in response to the HI message, a router advertisement (RA) message, and a $\Omega$ having an ensured unique temporary address from the routers connected to the candidate APs and the target AP, to the access router managing the subnetwork of the mobile terminal; and (f) combining the RA message and the $\Omega$ that are received from the routers connected to the candidate APs and the target AP, and transmitting the combined message to the mobile terminal together with a fast binding acknowledgement (FBAck) message.

The completion of the (f) operation may imply the completion of the handover ready phase, and a timer operates for a predetermined time starting from the completion of the handover ready phase.

The mobile terminal may enter a handover action phase when the strength of the first signal falls below the first threshold THR_2 detected from the serving AP within the predetermined time.

The handover action phase may include (a) transmitting Link_GoingDown (LGD) Trigger information from the layer 2 to the layer 3; (b) transmitting a movement notification (MVN) message and the $\Omega$ including the unique temporary address from the mobile terminal to the access router that manages the subnetwork of the mobile terminal; and (c) tunneling by the access router that manages the subnetwork of the mobile terminal, ad transmitting a MVAck message in response to the MVN message from the access router to the mobile terminal.

The (c) operation may transmit Link_Switch (LS) Trigger information from the layer 3 to the layer 2 when the MVAck message is received at the mobile terminal.

Following the transmission of the LS Trigger information from the layer 3 to the layer 2, the handover action phase may further include trying re-association to the target AP selected from the candidate APs of the neighbor AP list; transmitting Link_Up Trigger information from the layer 2 to the layer 3 when the re-association is completed; configuring the mobile terminal using the RA message and the new temporary address contained in the $\Omega$ that are obtained from a previous subnetwork; transmitting a fast neighbor advertisement (FNA) message from the mobile terminal to the access router connected to the target AP; and transmitting the packets tunneled by routing at the access router that receives the FNA message, to the mobile terminal.

The handover ready phase may include (a) transmitting the LQCT Trigger information from the layer 2 to the layer 3; (b) selecting a candidate AP and a target AP that are neighbor APs capable of establishing new communications with the mobile terminal from the neighbor AP list, and retrieving information relating to the selected candidate AP and target AP; (c) transmitting the MAC address of the mobile terminal, the BSSIDs of the candidate APs and the target AP, and the FBU message from the mobile terminal to the access router that manages the subnetwork of the mobile terminal when the neighbor AP capable of establishing new communications with the mobile terminal belongs to the same subnetwork as the mobile terminal according to the information retrieval; and (d) transmitting a FBAck message in response to the FBU message from the access router managing the subnetwork of the mobile terminal to the mobile terminal.

The completion of the (d) operation may imply the completion of the handover ready phase, and a timer operates for a predetermined time starting from the completion of the handover ready phase.

The mobile terminal may enter the handover action phase when the strength of the first signal detected from the serving AP falls below the second threshold THR_2 within the predetermined time.

The handover action phase may include (a) transmitting LGD Trigger information from the layer 2 to the layer 3; (b) transmitting a MVN message from the mobile terminal to the access router that manages the subnetwork of the mobile terminal; and (c) buffering by the access router that manages the subnetwork of the mobile terminal, ad transmitting a MVAck message in response to the MVN message from the access router to the mobile terminal.

The (c) operation may transmit LS Trigger information from the layer 3 to the layer 2 when the MVAck message is received at the mobile terminal.

Following the transmission of the MVN message in the (b) operation, the handover action phase may further include retransmitting the MVN message when the mobile terminal does not receive the MVAck message from the access router within approximately 10 ms; and transmitting the LS Trigger information from the layer 3 to the layer 2 when the MVAck message is not received within 10 ms after retransmitting the MVN message.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a graph illustrating changes of the SNR of neighbor APs as the time passes by;

FIG. 7 is a flowchart explaining the handover ready phase when the serving AP currently communicating with the mobile terminal and the neighbor AP that may communicate with the mobile terminal belong to the same subnetwork;

DETAILED DESCRIPTION OF THE EMBODIMENTS

Figure 1:
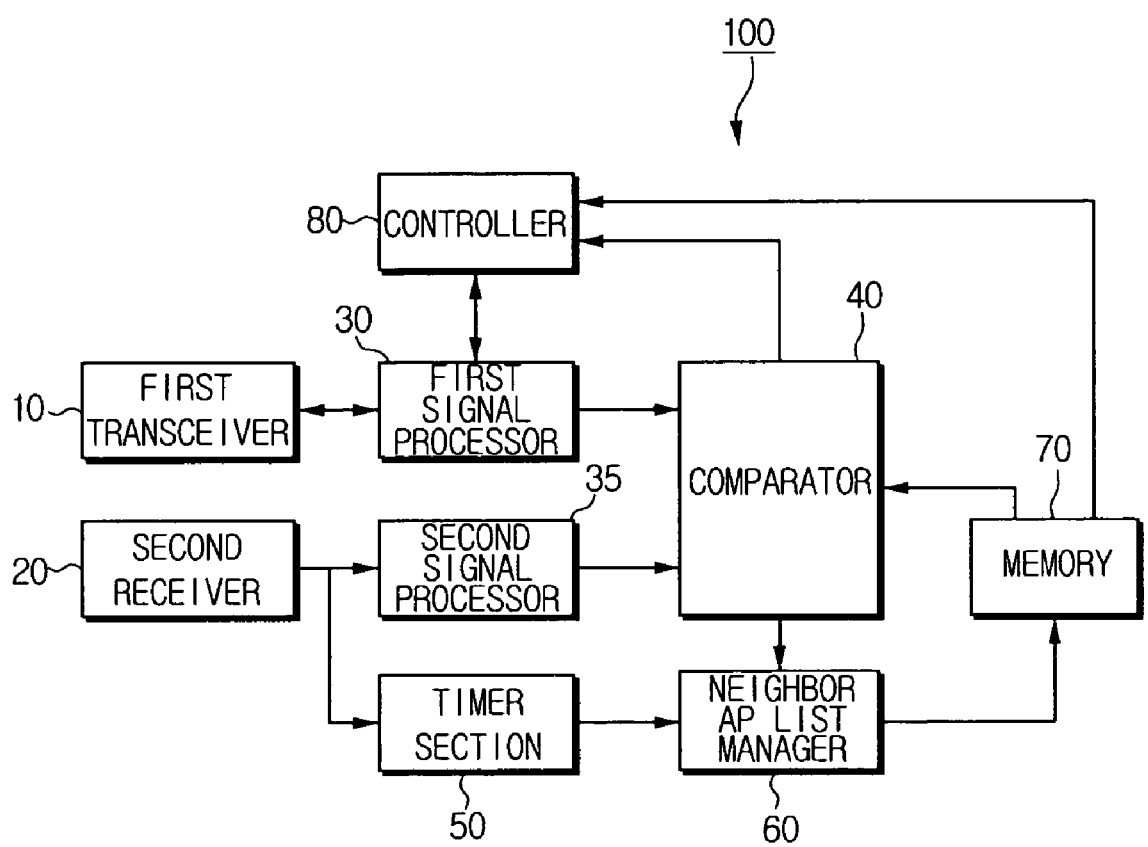
FIG. 1 is a block diagram of a mobile terminal for fast handover optimized for IEEE 802.11 networks according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a mobile terminal for a fast handover method that is optimized for the Institute of Electrical and Electronics Engineers (IEEE) 802.11 networks according to an embodiment of the present invention. In FIG. 1, the mobile terminal 100 includes a first transceiver 10, a second receiver 20, a first signal processor 30, a second signal processor 35, a comparator 40, a timer section 50, a neighbor access point (AP) list manager 60, a memory 70, and a controller 80. It is to be understood that the mobile terminal 100 may include other components besides those mentioned above.

The first transceiver 10 receives data from an AP that currently communicates with the mobile terminal 100 (hereinafter, referred to as a serving AP) over a data channel, provides the received data to the first signal processor 30, and wirelessly transmits data that is intended for the serving AP. The first transceiver 10 communicates with the serving AP according to IEEE 802.11.

The second receiver 20 receives a beacon frame signal that is transmitted from neighbor APs of the mobile terminal 100 over a control channel with 100 ms intervals, and provides the received beacon frame signal to the second signal processor 35. The mobile terminal 100 receives a beacon frame signal from APs at certain intervals (e.g., 100 ms intervals). Even when the mobile terminal 100 requests the beacon frame signal to neighbor APs, the mobile terminal 100 may receive the beacon frame signal. Advantageously, the second receiver 20 is realized with a scouter module. The second receiver 20 has two modes: an active mode to scan neighbor APs and an idle mode to suspend the scanning.

The first signal processor 30 processes the data provided from the first transceiver 10 and forwards the processed data to the controller 80 and the comparator 40. Particularly, the first signal processor 30 processes a certain parameter contained in the beacon frame signal that is received from the first transceiver 10 and provides the comparator 40 with data that aids in determining a radio channel state of the serving AP currently communicating with the mobile terminal 100.

Likewise, the second signal processor 35 processes a certain parameter contained in the beacon frame signal that is received from the second receiver 20 and provides the comparator with data that aids in determining the radio channel state of the neighbor APs of the mobile terminal 100. The certain parameter may be signal-to-noise ratio (SNR), received signal strength indication (RSSI), bit error rate (BER), and/or packet error rate (PER) or a combination thereof. In an embodiment of the present invention, the SNR is adopted to determine the radio channel state of the neighbor APs of the serving AP currently communicating with the mobile terminal 100 and the radio channel state of the neighbor APs of the mobile terminal 100. The first signal processor 30 and the second signal processor 35 process the SNR contained in the beacon frame signal and obtain Smoothed SNR in accordance with Equation 1. The obtained Smoothed SNR may be used in place of the SNR.

$$\text{Smoothed SNR} = K \times \text{SNR}_c + (1-K)\text{SNR}_p. \quad \text{[Equation 1]}$$

In Equation 1, K is a variable, $\text{SNR}_c$ is an SNR value measured at the current time, and $\text{SNR}_p$ is an SNR value measured at a previous period time.

Figure 2A:
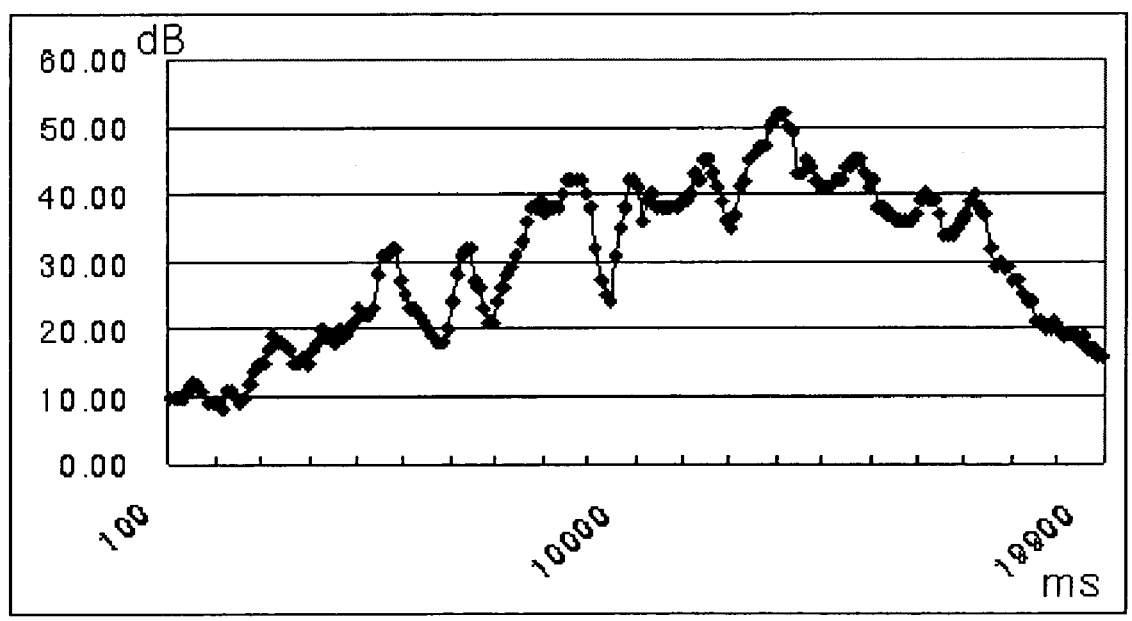
FIG. 2A is a graph showing changes of a SNR value received from a neighbor AP of the mobile terminal.
Figure 2B:
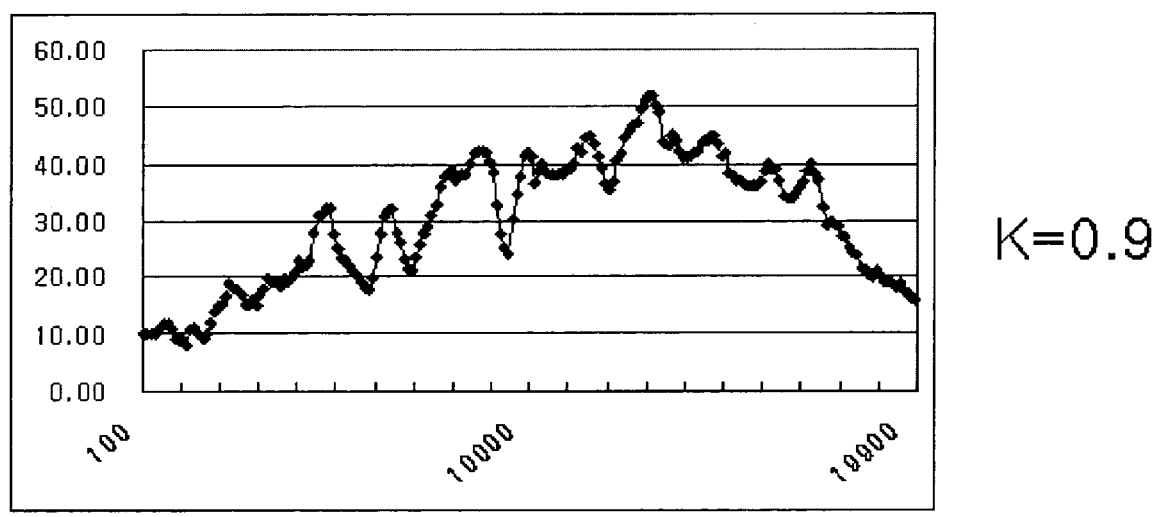
FIG. 2B through FIG. 2E are graphs showing changes of the Smoothed SNR calculated through the signal processing at a first signal processor or a second signal processor.
Figure 2C:
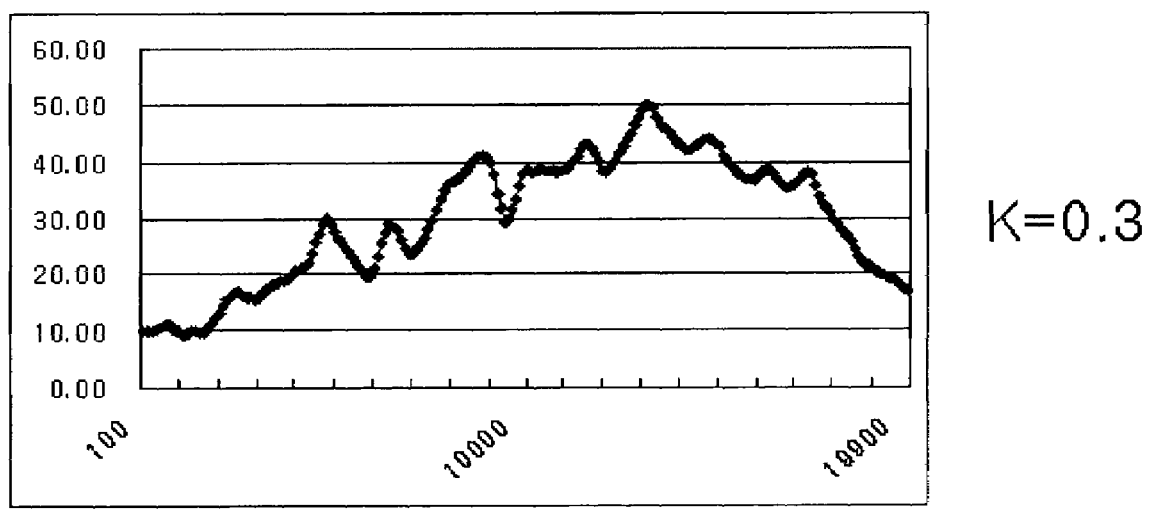
Figure 2D:
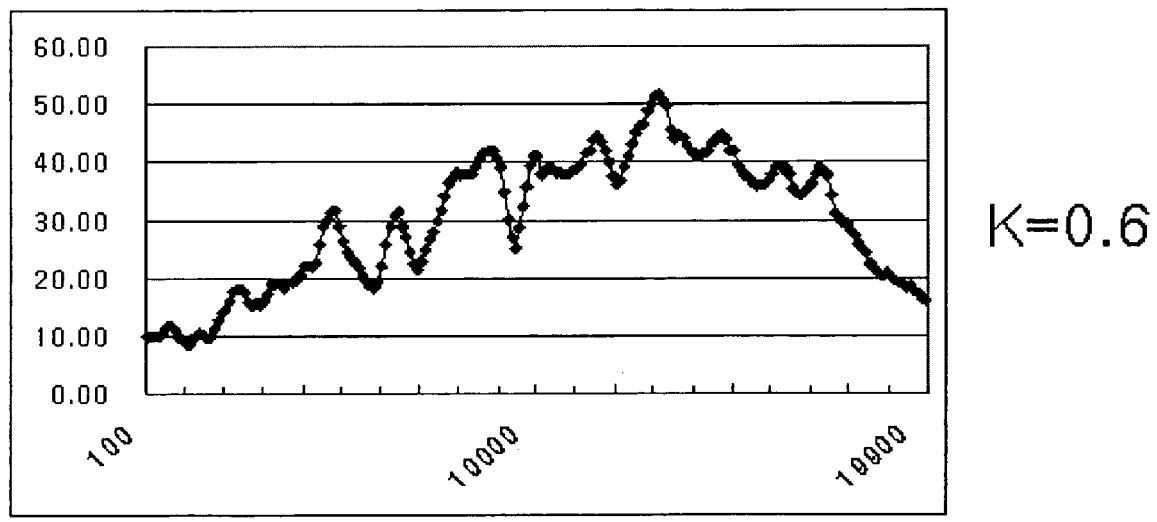
Figure 2E:
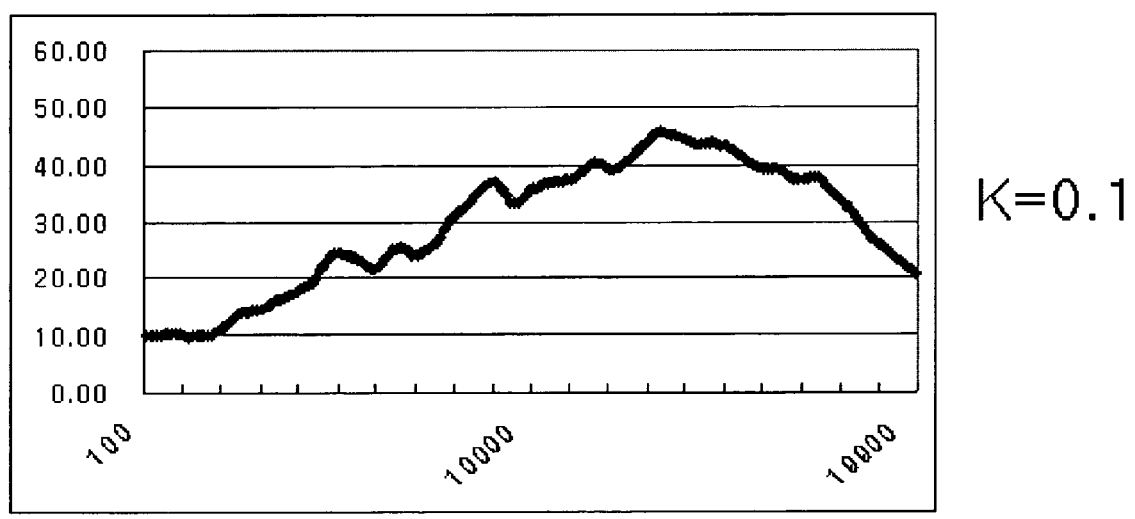

FIG. 2A is a graph showing changes of the SNR value received from the neighbor APs of the mobile terminal 100, and FIG. 2B through FIG. 2E show the changes of the Smoothed SNR value obtained through the signal processing at the first signal processor 30 and the second signal processor 35. Comparing with FIG. 2A, FIG. 2B through FIG. 2E show more stable change of the SNR. Thus, facilely determining the radio channel state of the neighbor APs of the mobile terminal 100 based on the changes of the SNR value is possible.

The comparator 40 compares the SNR values or the smoothed SNR values that are provided from the first and second signal processors 30 and 35 with pre-stored thresholds in the memory 70, and provides the comparison result to the neighbor AP list manager 60 and the controller 80.

The neighbor AP list manager 60 classifies the neighbor APs into a detected AP, a candidate AP, and a target AP based on the comparison result received from the comparator 40. The neighbor AP list manager 60 updates a neighbor AP list stored in the memory 70 according to the classification. If the state of the neighbor AP is changed, for example, if the detected AP is switched to the candidate AP or if the candidate AP is switched to the target AP, the neighbor AP list manager 60 updates the neighbor AP list stored in the memory 80. The detected AP is an AP of which a signal alone is detected without an ensured quality of the radio channel. The candidate AP has guaranteed quality of the radio channel to some degree, and the target AP has the largest value of the signal detected from the neighbor APs, that is, the largest SNR value. As will be illustrated, renewed communications among the candidate AP and the target AP with the mobile terminal 100 is possible.

The timer section 50 is equipped with a plurality of timers that correspond to the neighbor APs of the mobile terminal 100. The respective timers count starting from the time when the beacon frame signal is received from the neighbor APs with, for example, 100 ms intervals. When the beacon frame signal is not received from a neighbor AP with 100 ms intervals, the timer section 50 informs the neighbor AP list manager 60 that the beacon frame signal is not received. Accordingly, the neighbor AP list manager 60 updates the neighbor AP list stored in the memory 70, which will be explained later in further detail. If the beacon frame signal is not received from a neighbor AP at all, the timer section 50 informs the neighbor AP list manager 60 of this fact and the neighbor AP list manager 60 deletes the neighbor AP from the neighbor AP list.

The controller 80 analyzes the state of the radio channel of the serving AP currently communicating with the mobile terminal 100 via a use of the data that is received from the first signal processor 30. If the radio channel state of the serving AP is normal according to the analysis, the controller 80 continues to receive data from the serving AP. Otherwise, if the radio channel state is abnormal, the controller 80 commences operations for the handover.

Specifically, when the SNR, which is detected from the serving AP that is currently communicating with the mobile terminal 100, falls below a predefined first threshold THR_1, the controller 80 controls the mobile terminal 100 to enter a handover ready phase. When the SNR detected from the serving AP falls below a predefined second threshold THR_2, the controller 80 controls the mobile terminal 100 to be handed over. When the detected SNR falls below a predefined third threshold THR_3, the controller 80 interrupts the communications between the mobile terminal 100 and the serving AP. Alternately, the controller may try to reconnect to the serving AP.

Figure 3:
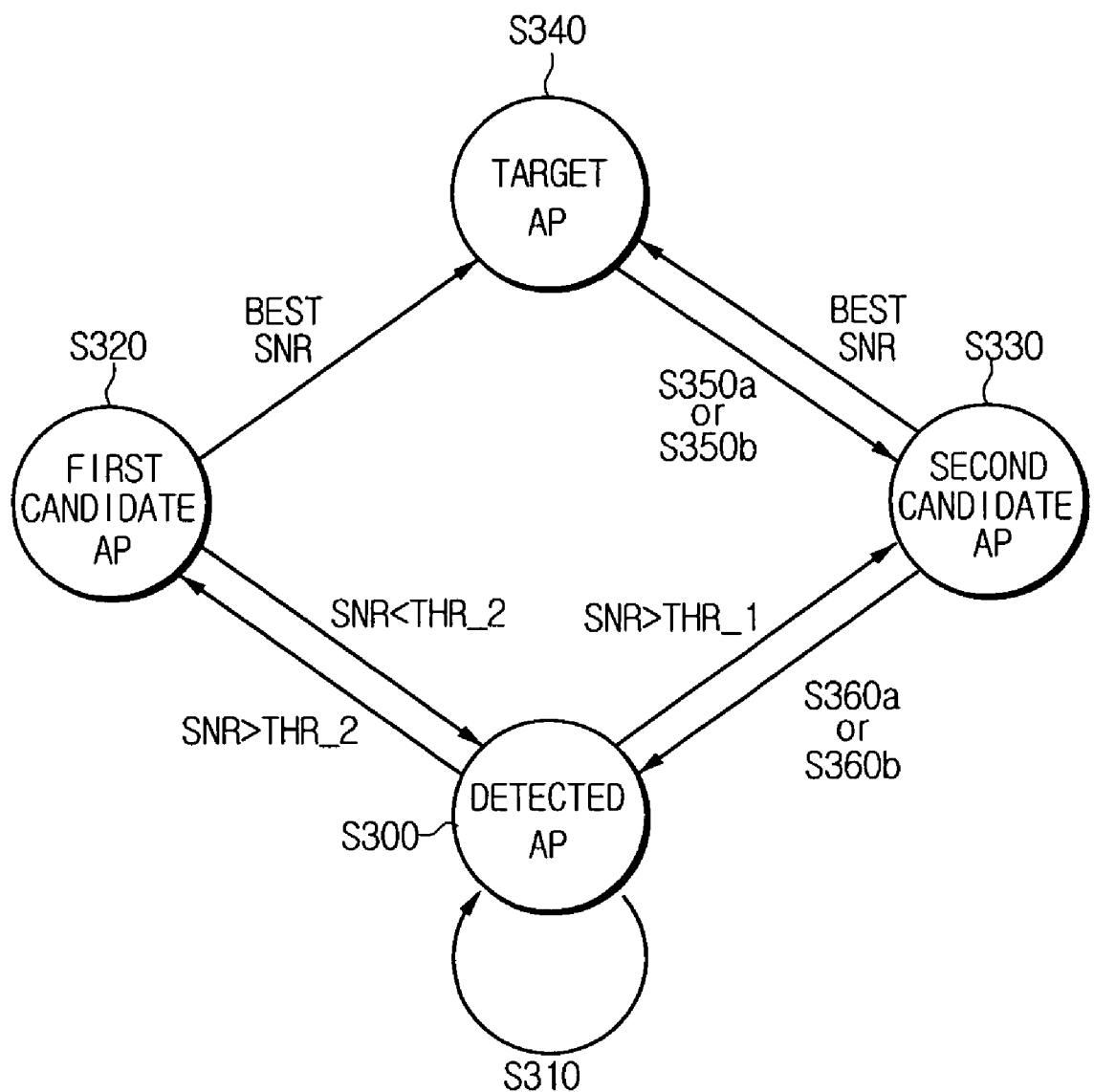
FIG. 3 is a diagram illustrating changes of a state of a neighbor AP of the mobile terminal according to the changes of the SNR.

FIG. 3 depicts the state change of neighbor APs of the mobile terminal 100 according to changes of the SNR. In FIG. 3, the first threshold THR_1 is greater than the second threshold THR_2.

Referring to FIG. 3, the SNR initially detected from a neighbor AP is below the predefined second threshold THR_2. In this situation, that the neighbor AP is the detected AP is assumed (S300). If the beacon frame signal is not received from a neighbor AP within 100 ms in the detected AP state (S310), the neighbor AP list manager 60 controls the neighbor AP to maintain the detected AP state (S300). If even one beacon frame signal is not received from a neighbor AP within 300 ms at all, the neighbor AP list manager 60 deletes the neighbor AP from the neighbor AP list stored in the memory 70.

In the detected AP state (S300), when the SNR, which indicates the channel state of the neighbor AP, becomes greater than the predefined second threshold THR_2, the neighbor AP list manager 60 changes the state of the detected AP to a first candidate AP state (S320). If an SNR indicating the channel state of the detected AP becomes greater than the predefined first threshold THR_1, the neighbor AP list manager 60 changes the state of the detected AP to a second candidate AP state (S330).

The first candidate AP state will now be explained. As for the first candidate AP state in operation S320, the SNR detected from the neighbor AP is greater than the second threshold THR_2 (S320). In this state, the SNR detected from the neighbor AP falls below the second threshold THR_2 again, and the state of the neighbor AP returns to the detected AP state (S300) from the first candidate AP state (S320). Accordingly, the current state of the neighbor AP is again changed from the first candidate AP to the detected AP in the neighbor AP list stored in the memory 70.

Meanwhile, in the first candidate AP state in operation S320, when the SNR that is detected from the neighbor AP of the mobile terminal 100 increases and presents the greatest value among the other neighbor APs, the neighbor AP list manager 60 changes the state of the neighbor AP from the first candidate AP state (S320) to the target AP state (S340) and updates the neighbor AP list stored in the memory 70.

If the SNR indicating the channel state of the target AP (S340) decreases such that the SNR falls below the SNR detected from the other neighbor APs (S350a), or, if the second receiver 20 of the mobile terminal 100 does not receive the beacon frame signal from the target AP with 100 ms intervals more than at least one time (S350b), the target AP (S340) is changed to the second candidate AP state (S330).

Next, the second candidate AP state (S330) is explained in detail. The second candidate AP state (S330) is determined when the state is changed from the target AP state (S340) as mentioned above and when the SNR indicating the channel state of the detected AP exceeds the first threshold THR_1 as well.

In the second candidate AP state (S330), when the SNR detected from the second candidate AP exceeds the SNR detected from the other neighbor APs, the second candidate AP state (S330) returns to the target AP state (S340).

Otherwise, in the second candidate AP state (S330), when the SNR falls below the first threshold THR_1 (S360a), or, when the second receiver 20 of the mobile terminal 100 does not receive the beacon frame signal from the candidate AP more than at least one time (S360b), the state of the neighbor AP is changed from the second candidate AP state (S330) to the detected AP state (S300).

Figure 4:
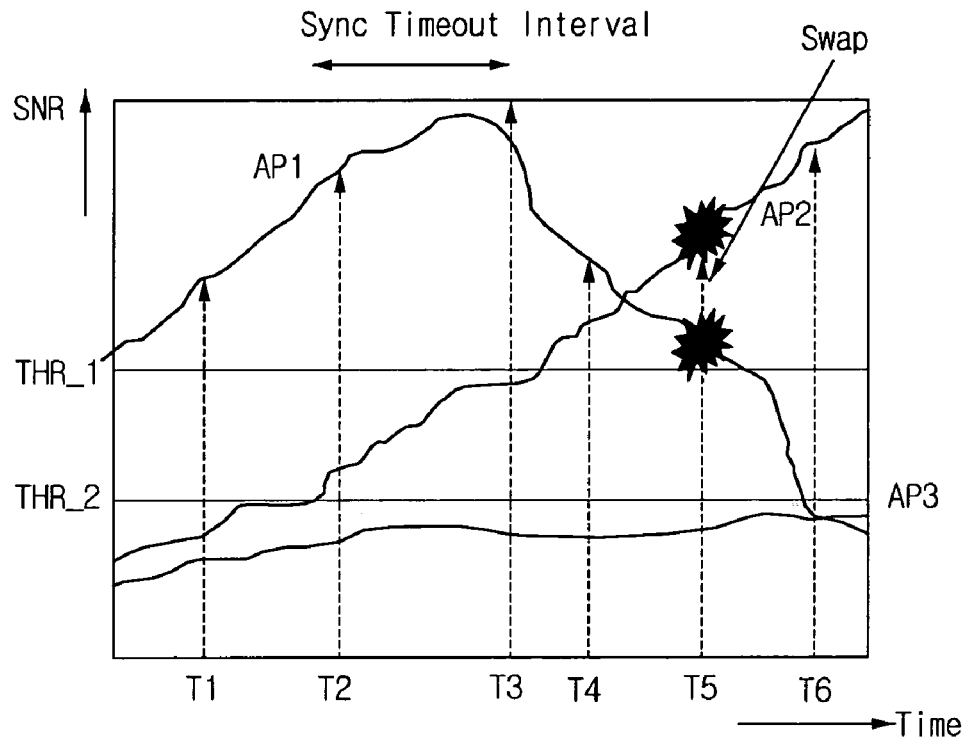

FIG. 4 is a graph showing the changes of the SNR of the neighbor APs as the time passes by. In FIG. 4, AP1, AP2, and AP3 represent neighbor APs of the mobile terminal 100.

As illustrated in FIG. 4, the SNR detected from the AP1 exceeds a predefined first threshold THR_1 and is the greatest value among the SNRs detected from the other neighbor APs at the time T1. Thus, the AP1 enters the target AP state. The SNRs detected from the AP2 and the AP3 are below a predefined second threshold THR_2, and accordingly, the AP2 and the AP3 maintain the detected AP state.

At the time T2, as the SNR detected from the AP2 exceeds the second threshold THR_2, the state of the AP2 is changed from the detected AP to the candidate AP. At the time T3, the mobile terminal 100 cannot receive the beacon frame signal within the specific time, that is, within 100 ms from the AP1. At the time T3, the AP1 is changed from the target AP to the candidate AP and accordingly, the state of the AP2 is changed from the candidate AP state to the target AP state.

At the time T4, the mobile terminal 100 receives the beacon frame signal from the AP1 and the SNR detected from the AP1 is the greatest value. Thus, the state of the AP1 returns to the target AP from the candidate AP and the state of the AP2 returns to the candidate AP from the target AP.

At the time T5, as the SNR detected from the AP2 exceeds the SNR detected from the AP1 and becomes the greatest value, the AP2 becomes the target AP and the AP1 becomes the candidate AP. At the time T6, the SNR detected from the AP1 falls below the second threshold THR_2, and thus the AP1 becomes the detected AP.

The above states of the neighbor APs at the time T1 through T6 can be arranged in Table 1.

TABLE 1

| Time 1 | Target AP | AP1 |
|---|---|---|
|  | Candidate AP | NONE |
|  | Detected AP | AP2, AP3 |
| Time 2 | Target AP | AP1 |
|  | Candidate AP | AP2 |
|  | Detected AP | AP3 |
| Time 3 | Target AP | AP2 |
|  | Candidate AP | AP1 (Sync timeout) |
|  | Detected AP | AP3 |
| Time 4 | Target AP | AP1 (Re-sync) |
|  | Candidate AP | AP2 |
|  | Detected AP | AP3 |
| Time 5 | Target AP | AP2 (Swap) |
|  | Candidate AP | AP1 |
|  | Detected AP | AP3 |
| Time 6 | Target AP | AP2 |
|  | Candidate AP | NONE |
|  | Detected AP | AP1, AP3 |

The neighbor AP list stored in the memory 70 is managed as aforementioned.

The handover method optimized for the IEEE 802.11 networks, according to an embodiment of the present invention, largely includes a handover ready phase and a handover action phase. The handover ready phase is performed when the value indicating the channel state of the serving AP currently communicating with the mobile terminal 100, that is, the SNR, falls below the predefined first threshold THR_1. The handover action is carried out when the value indicating the channel state of the serving AP currently communicating with the mobile terminal 100, that is, the SNR, falls below the predefined second threshold THR_2. It is to be noted that the first threshold THR_1 is greater than the second threshold THR_2 as explained above.

Hereinafter, the handover ready phase and the handover action phase are explained in that order. Once the handover ready phase commences, the mobile terminal 100 determines the candidate AP. Then, the target AP, in the neighbor AP list managed therein, retrieves information relating to the determined candidate AP and target AP, and obtains the information as for the candidate AP and the target AP. Next, the mobile terminal 100 transmits a fast binding update (FBU) message, basic service set identifiers (BSSIDs) as to the target AP and the candidate APs, and a media access control (MAC) address to a designated access router (AR) thereof.

Figure 5:
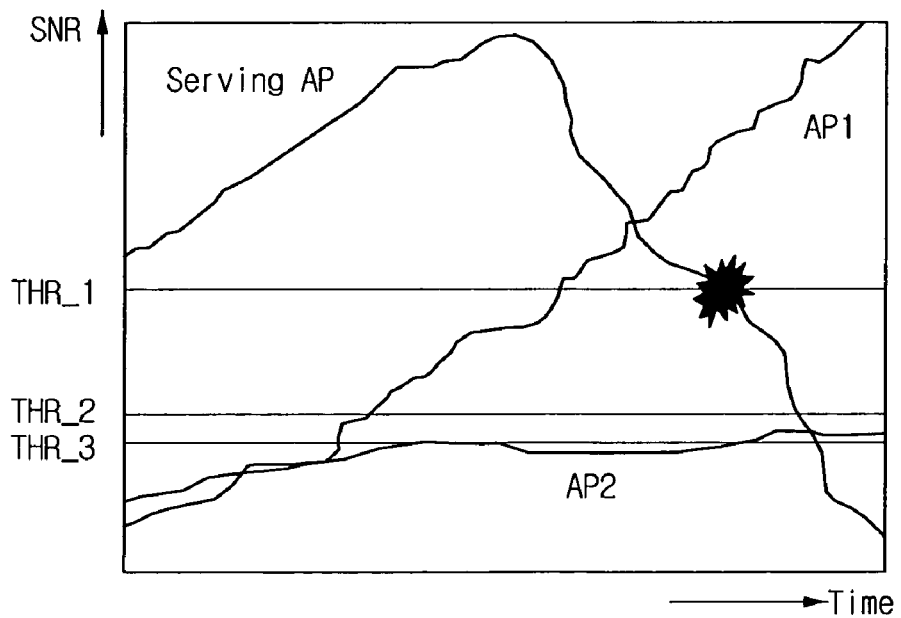
FIG. 5 is a graph illustrating when a handover ready phase is performed according to an embodiment of the present invention.

FIG. 5 is a graph showing when the handover ready phase is conducted according to an embodiment of the present invention. In FIG. 5, when the SNR indicating the channel state of the serving AP currently communicating with the mobile terminal 100 falls below the predefined first threshold THR_1, Link_Quality_Crosses_Threshold (LQCT) Trigger information is transmitted from a layer 2 to a layer 3. Then, the ready operation for the handover is conducted.

The handover ready phase is conducted differently in different cases. For example, one case occurs when the serving AP currently communicates with the mobile terminal 100 and a neighbor AP (candidate AP or target AP) that may newly communicate with the mobile terminal 100 belong to different subnetworks. As another example, a second case occurs when the serving AP currently communicating with the mobile terminal 100 and a neighbor AP (candidate AP or target AP) that may newly communicate with the mobile terminal 100 belong to the same subnetwork.

Figure 6:
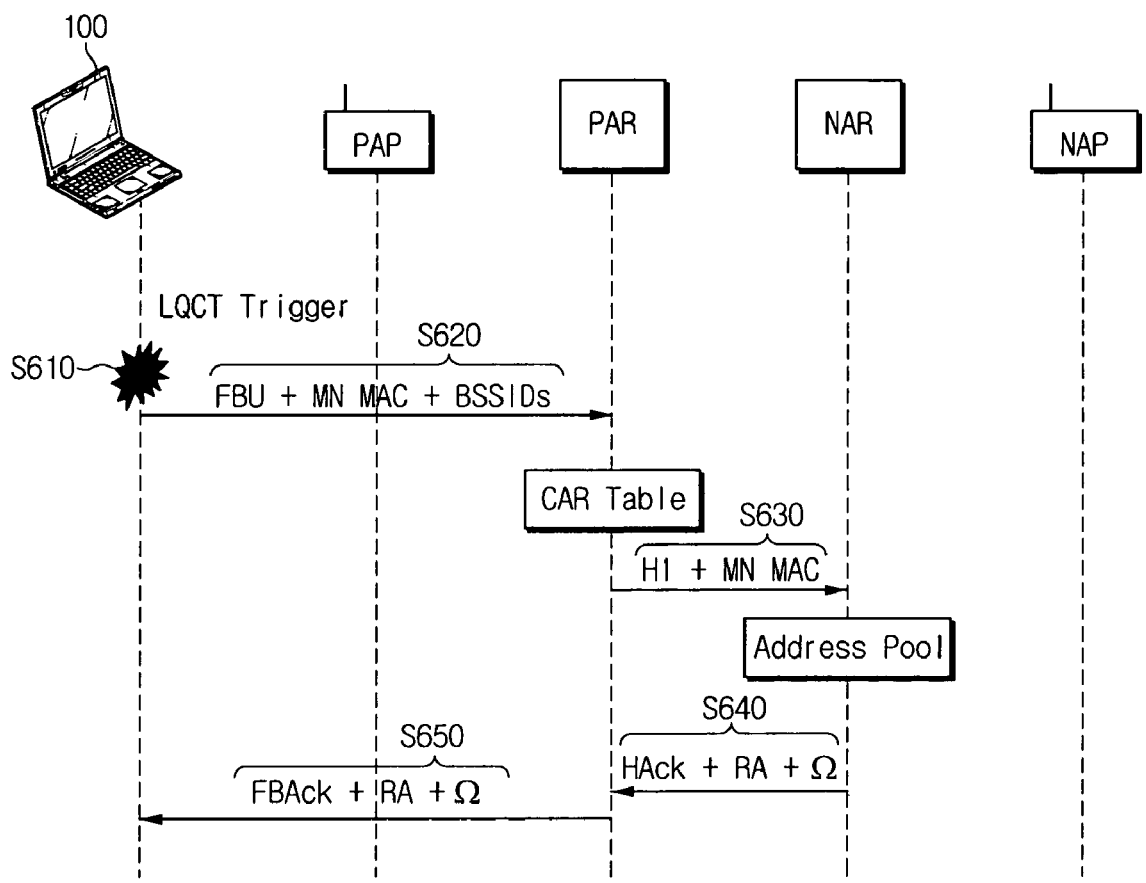
FIG. 6 is a flowchart explaining the handover ready phase when a serving AP currently communicating with the mobile terminal and a neighbor AP that may establish new communications with the mobile terminal belong to different subnetworks.

FIG. 6 is a flowchart explaining the handover ready operation when the serving AP currently communicating with the mobile terminal 100 and a neighbor AP (candidate AP or target AP) that may establish new communications with the mobile terminal 100 belong to different subnetworks.

Referring to FIG. 6, when the SNR indicating the channel state of the serving AP in communication with the mobile terminal 100 falls below the predefined first threshold THR_1, the LQCT Trigger information is transmitted from the layer 2 to the layer 3 (S610). The mobile terminal 100 transmits the FBU message, a MAC address thereof, and BSSIDs of the target AP and the candidate APs to the access router (hereinafter, referred to as PAR for the simplicity) that manages the subnetwork to which the mobile terminal 100 belongs (S620). The BSSIDs of the APs contain MAC address information of the APs.

Meanwhile, a locking operation is performed from when the mobile terminal 100 transmits the FBU message, the MAC address thereof, and the BSSIDs of the target AP and the candidate APs. Once the locking operation is performed, even when a new candidate AP is discovered from among the neighbor APs of the mobile terminal 100, the neighbor AP list manager 60 cannot add the new candidate AP into the neighbor AP list stored in the memory 70 but, rather, inserts the new candidate AP into a waiting queue. The mobile terminal 100 may only delete an AP from the APs arranged in the neighbor AP list and determine a new target AP from among the candidate APs. The locking operation stops when the target AP is determined and a movement notification (MVN) message is transmitted to the target AP, or, when a preset time elapses after the mobile terminal 100 receives a fast binding acknowledgement (FBAck) message, which will be described in detail.

The PAR receiving the information from the mobile terminal 100, checks addresses of access routers (hereinafter, referred to as NAR for the simplicity) respectively connected to the target AP and the candidate APs that may communicate with the mobile terminal 100 using a CAR table. Note that the NAR and the PAR belong to different subnetworks.

Table 2 shows an exemplary CAR table.

TABLE 2

| BSSID of neighbor AP | Router address | Network prefix | Lifetime(s) |
|---|---|---|---|
| 00:02:2D:46:47:23 | 3ffe:100::1 | 3ffe:100::/64 | 300 |
| 01:02:DD:26:10:09 | 3ffe:101::1 | 3ffe:101::/64 | 400 |
| 22:14:A1:AA:B2:1A | 3ffe:101::1 | 3ffe:101::/64 | 400 |

As shown in Table 2, the PAR may obtain the address of the routers NARs connected to the neighbor APs, that is, the target AP and the candidate APs that may communicate with the mobile terminal 100 among the neighbor APs, based on the BSSIDs of the neighbor APs of the CAR table.

Next, the PAR transmits a handover initiation (HI) message and the MAC address of the mobile terminal 100 to the addresses of the routers NARs connected to the target AP and the candidate APs, respectively (S630).

Upon receiving the HI message and the MAC address of the mobile terminal 100 from the PAR, the NARs transmits a handover acknowledgement (HAck) message in response to the HI message, a router advertisement (RA) message, and Ω, which is a message containing a temporary address with ensured uniqueness to the PAR (S640). At this time, if other mobile terminals join the subnetworks of the NARs, the other mobile terminals may use Ω. To prevent this, the respective NAR defends Ω via a use of Proxy Neighbor Cache Entry as described in RFC 2642.

Typically, the respective routers generate a certain number of new temporary addresses that are fit for the prefix of the network managed by the routers as described in the RFC 3041, or obtain addresses from a DHCPv6 server. The generated or obtained addresses go through the duplication check according to standard duplication address detection (DAD) of the RFC 2641. The unique addresses according to the duplication check are stored in an address pool managed by the router. Ω is defined as a message containing one of the certain number of the temporary addresses that are stored in the address pool and have the ensured uniqueness. In light of the above explanation, the reception of the RA message and Ω at the PAR implies the completion of the movement detection and the DAD.

The PAR that manages the subnetwork of the mobile terminal 100 combines the RA message and Ω received from the NARs connected to the target AP and the candidate APs, and transmits the combined RA message and Ω to the mobile terminal 100 together with the FBAck message (S650). Upon receiving the combined RA message and Ω together with the FBAck message, the mobile terminal 100 terminates the handover ready phase and operates the timer section 50 to count for a predetermined time, substantially, for example, for 3 seconds. When the predetermined time elapses, the aforementioned locking operation stops.

FIG. 7 is a flowchart explaining the handover ready phase when the serving AP currently communicating with the mobile terminal 100 and the neighbor AP that may communicate with the mobile terminal 100 belong to the same subnetwork.

Referring to FIG. 7, the SNR indicating the channel state of the serving AP in communication with the mobile terminal 100 falls below the first threshold THR_1, the LQCT Trigger is generated (S710). Next, the mobile terminal 100 transmits to the AR connected thereto the FBU message, a MAC address thereof, and the BSSIDs of the target AP and the candidate AP that belong to the same subnetwork as the serving AP in communication with the mobile terminal 100 (S720).

Since the neighbor AP that may newly communicate with the mobile terminal 100 and the mobile terminal 100 belong to the same subnetwork, the IP handover is not necessary. Nevertheless, the handover is still required according to specifications of the IEEE 802.11 standards. Thus, the AR transmits the FBAck message to the mobile terminal 100 (S730), and thus the handover ready operation is completed. The mobile terminal 100 operates the timer section 50 to count for a predetermined time, substantially, for example, for 3 seconds. When the predetermined time elapses, the aforementioned locking operation is terminated.

Figure 8A:
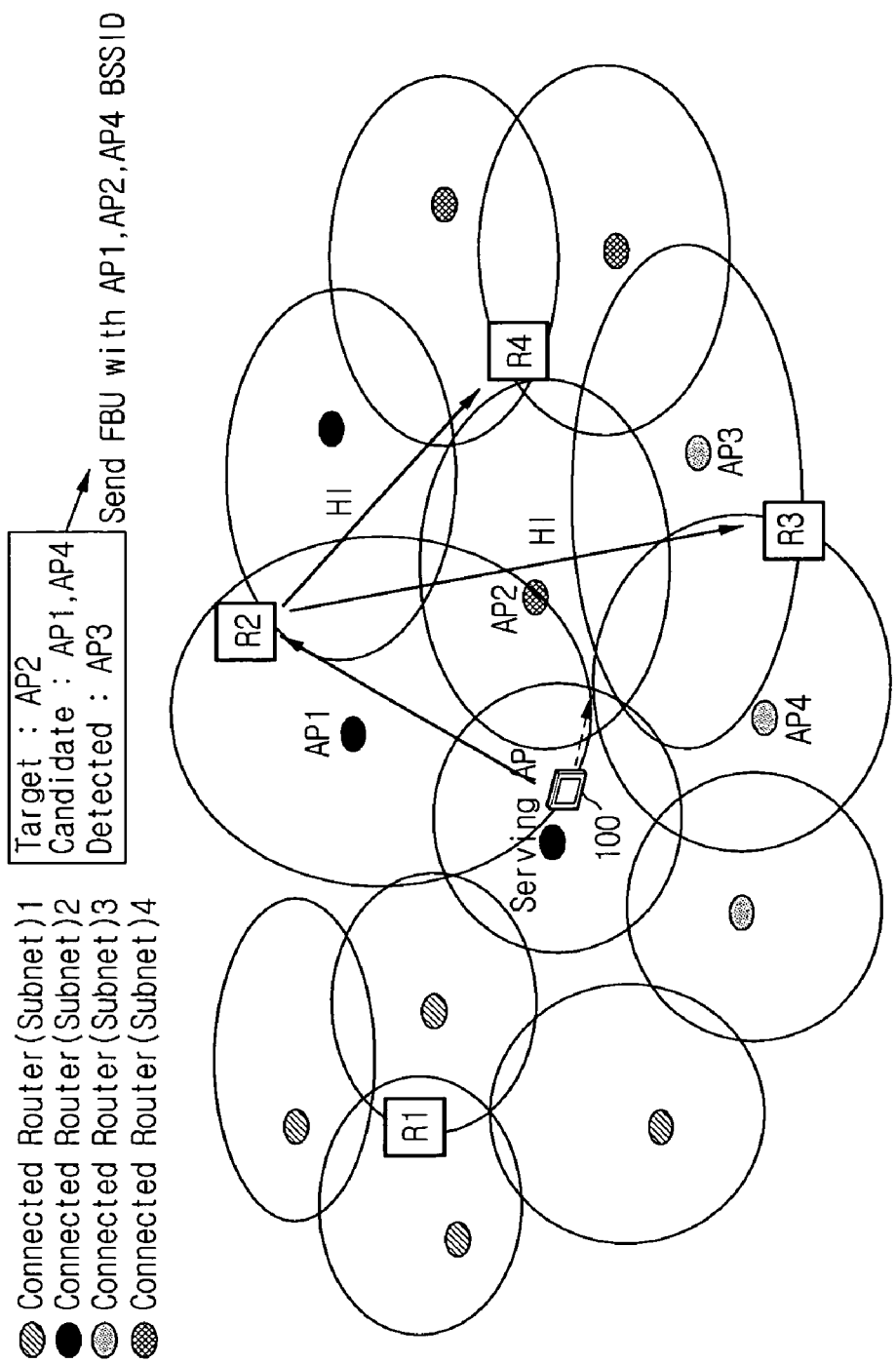
FIG. 8A and FIG. 8B depict the handover ready phase in further detail.
Figure 8B:
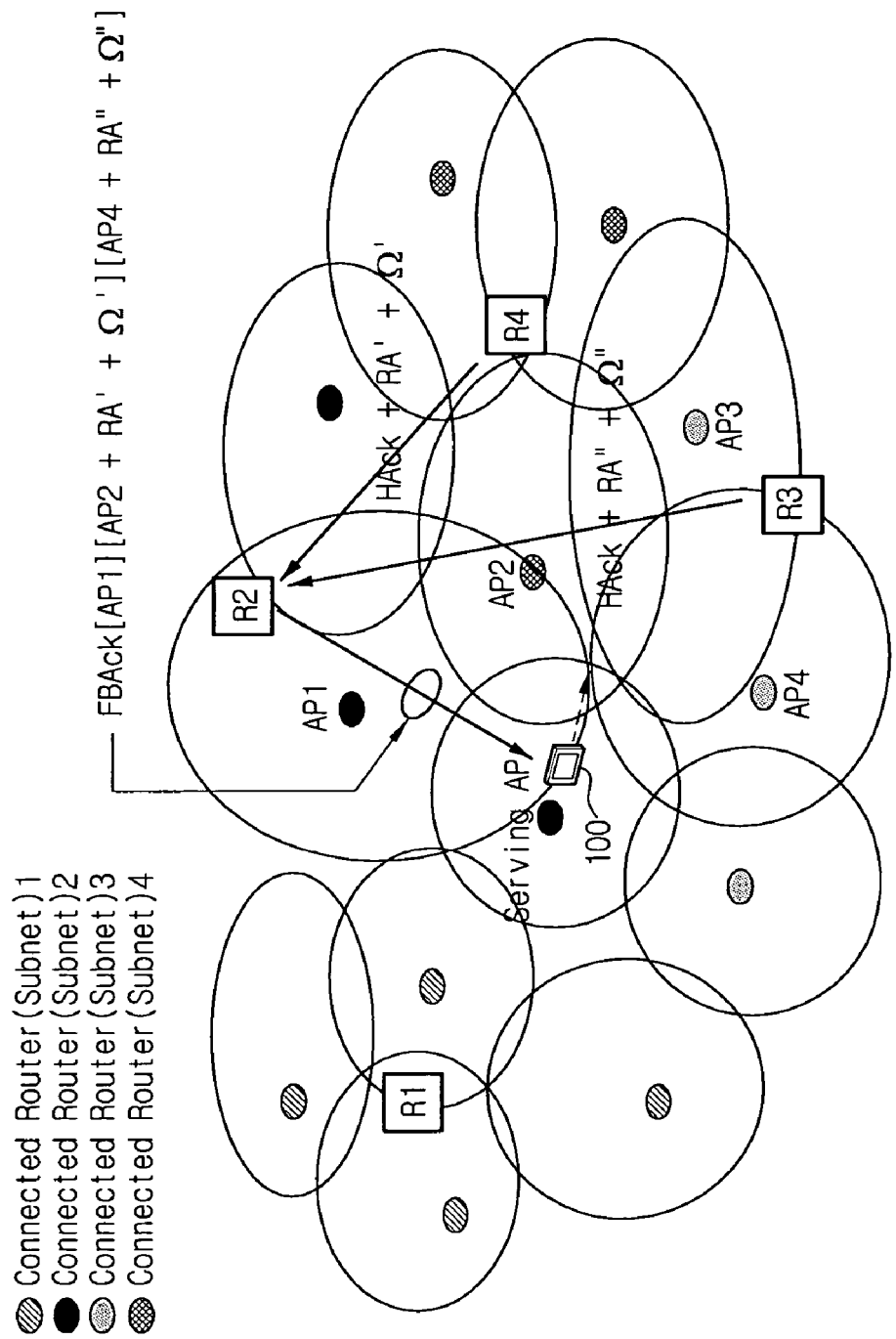

FIG. 8A and FIG. 8B depict the handover ready phase in further detail. Here, let AP1 and AP4 each represent a candidate AP, AP3 represents a detected AP, and AP2 represent a target AP. The serving AP currently communicating with the mobile terminal 100 and the AP1, being the candidate AP, belong to the same subnetwork and both are connected to the same second router R2. Likewise, the AP3 being the detected AP and the AP4, being the candidate AP, belong to the same subnetwork and are connected to the same router, a third router R3. The AP2 is connected to a fourth router R4.

When the SNR detected from the serving AP in communication with the mobile terminal 100, falls below the first threshold THR_1 and the LQCT Trigger information is transmitted from the layer 2 to the layer 3, the mobile terminal 100 transmits the FBU message, a MAC address thereof, the BSSID of the AP2 being the target AP, and the BSSIDs of the AP1 and AP4 being the candidate AP, to the second router R2 that manages the subnetwork of the mobile terminal 100. While the AP1, which belongs to the same subnetwork as the serving AP communicating with the mobile terminal 100, shares the second router R2, the AP2 and AP4, which belong to the different subnetworks from the serving AP communicating with the mobile terminal 100, are connected to the fourth router R4 and the third router R3, respectively.

As the AP2 and AP4 belong to the different subnetworks from the mobile terminal 100, the second router R2 transmits the HI message and the MAC address of the mobile terminal 100 to the fourth router R4 connected to the AP2 being the target AP and the third router R3 connected to the AP4 being the candidate AP. As for the AP1 connected to the second router R2 in the same subnetwork as the mobile terminal 100, the second router R2 needs not transmit the HI message and the MAC address of the mobile terminal 100. Instead, the second router R2 transmits the FBAck message to the mobile terminal 100.

Upon receiving the HI message and the MAC address of the mobile terminal 100 from the second router R2, the fourth router R4 connected to the AP2 being the target AP transmits a HAck message in response to the HI message, a RA' message, and Ω' including the unique temporary address, to the second router R2. Similarly, the third router R3 connected to the AP4 being the candidate AP transmits a HAck message in response to the HI message, a RA" message, and Ω" including the unique temporary address, to the second router R2.

The second router R2 combines the HAck message, the RA' message, and Ω' received from the fourth router R4 connected to the AP2 being the target AP with the HAck message, the RA" message, and Ω" received from the third router R3 connected to the AP4 being the candidate AP, and transmits the combined messages to the mobile terminal 100 together with the FBAck message.

Figure 9A:
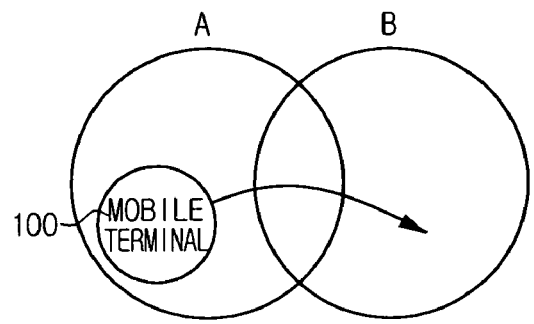
FIG. 9A through FIG. 9C depict three movement paths of the mobile terminal during the handover.
Figure 9B:
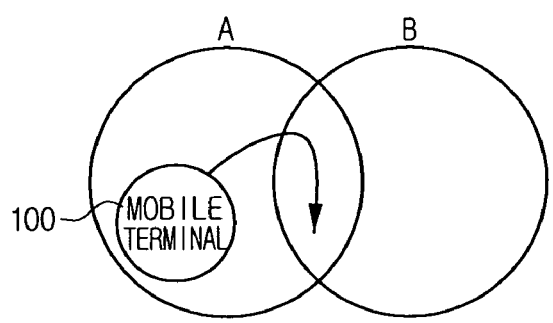
Figure 9C:
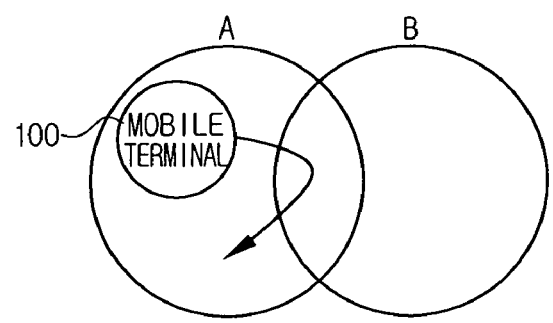

FIG. 9A through FIG. 9C depict three movement paths of the mobile terminal 100 during the handover. FIG. 9A depicts that the handover action phase is performed within the predetermined time, which, according to an embodiment of the invention, is substantially, within 3 seconds to be counted by the timer section 50 after the handover ready phase. Specifically, after the handover ready phase is completed, the SNR detected from the serving AP within the predetermined time counted by the timer section 50 falls below the second threshold THR_2. The mobile terminal 100 enters the handover action phase normally. The mobile terminal 100 stops the locking operation with respect to the candidate APs and selects the target AP among the candidate APs.

FIG. 9B shows the case when the mobile terminal 100 does not enter the handover action phase within the predetermined time of 3 seconds to be counted by the timer section 50 after the handover ready phase. After the handover ready phase is completed, when the SNR detected from the serving AP does not fall below the second threshold THR_2 within the predetermined time counted by the timer section 50 and lies between the first threshold THR_1 and the second threshold THR_2, the handover ready phase recommences after the predetermined time. The mobile terminal 100 updates the candidate AP in the neighbor AP list based on the AP lists of the waiting queue, and selects the target AP from the updated candidate APs. Next, the mobile terminal 100 retransmits the BSSIDs of the updated candidate AP and the target AP, the MAC address of the mobile terminal 100, and the FBU message to its AR.

FIG. 9C depicts the handover initialization of the mobile terminal 100. After the handover ready phase is completed, when the SNR detected from the serving AP exceeds the first threshold THR_1 within the predetermined time of 3 seconds to be counted by the timer section 50, the initialization is performed. At the initialization, the neighbor AP list manager 60 deletes all of the candidate AP and the target AP from the neighbor AP list stored in the memory 70. Subsequently, the neighbor AP list is re-organized by comparing the SNRs defected from the neighbor APs by means of the passive scanning with predefined thresholds.

Figure 10:
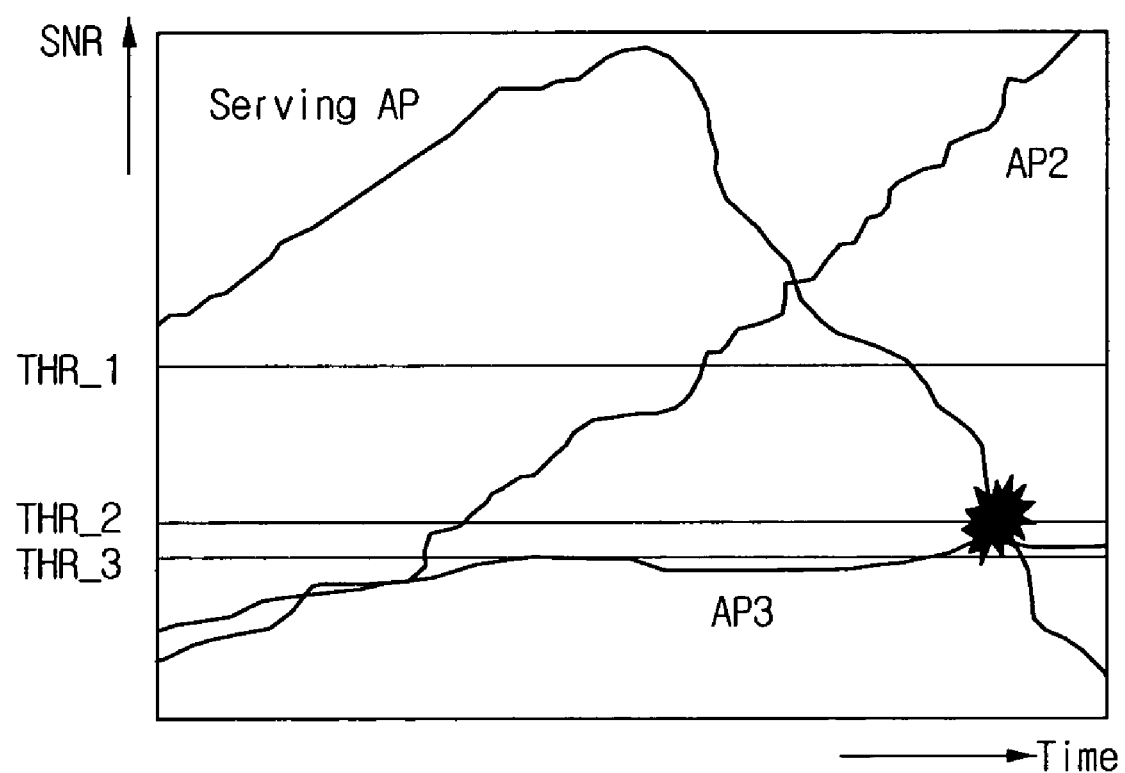
FIG. 10 is a graph showing when the handover action phase is conducted.

FIG. 10 is a graph showing when the handover action phase is conducted. In FIG. 10, when the SNR detected from the serving AP currently communicating with the mobile terminal 100 falls below the second threshold THR_2, Link Going-Down (LGD) Trigger information is transmitted from the layer 2 to the layer 3 and the handover action is conducted in the layer 3.

The handover action phase is similar to the handover ready phase. As such, the handover action phase is conducted depending on whether the target AP that will communicate with the mobile terminal 100 belongs to the same subnetwork as the mobile terminal 100.

Figure 11:
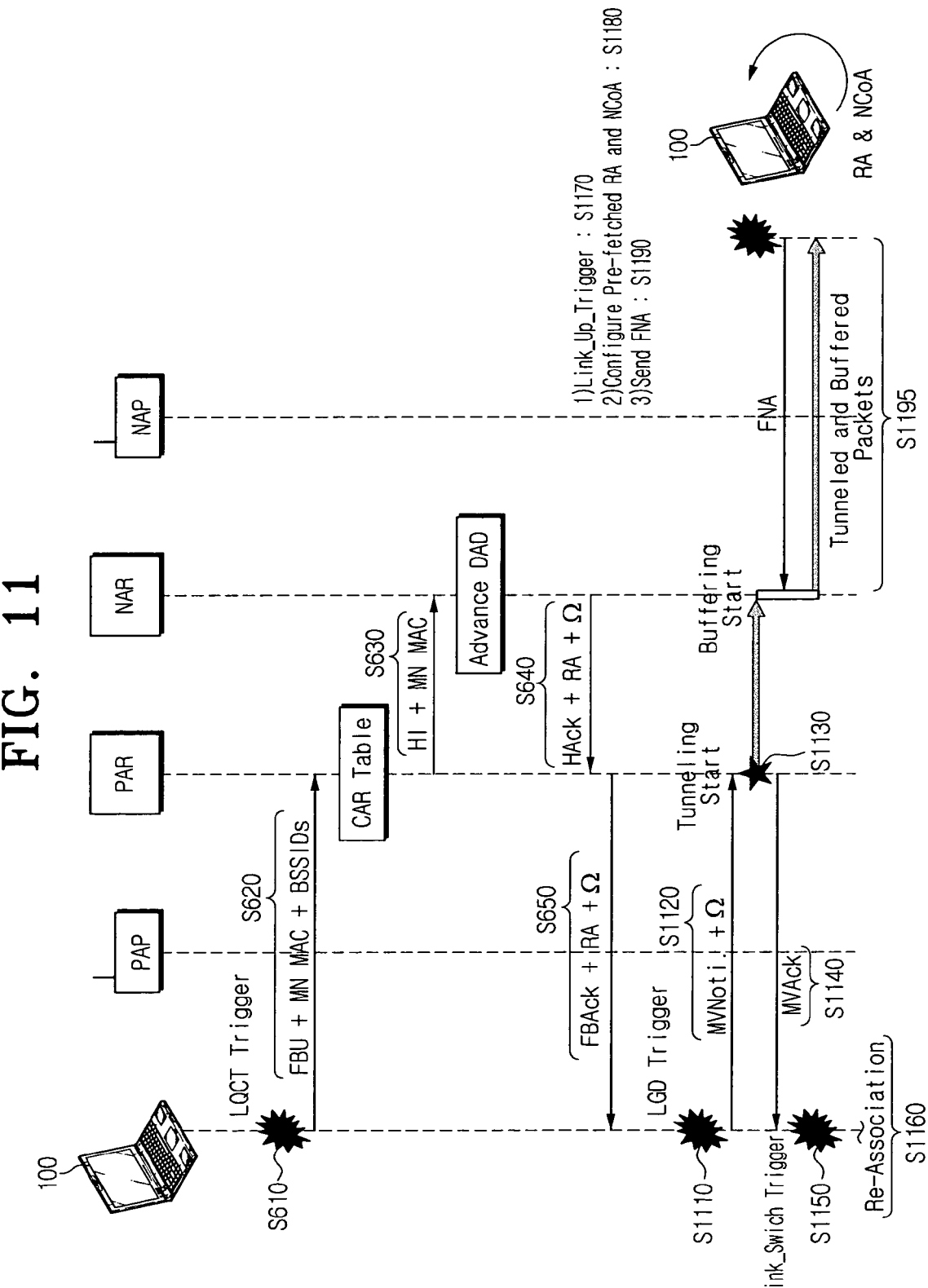
FIG. 11 is a flowchart explaining the handover action phase when the mobile terminal communicates with a target AP belonging to a different subnetwork.

FIG. 11 is a flowchart explaining the handover action phase when the mobile terminal 100 communicates with a target AP belonging to a different subnetwork. Operations S610 through S650 in FIG. 11 are performed at the handover ready phase, and thus not illustrated herein for brevity.

Referring to FIG. 11, when the SNR detected from the serving AP currently communicating with the mobile terminal 100 falls below the second threshold THR_2, the LGD Trigger information is transmitted from the layer 2 to the layer 3 (S1110). The mobile terminal 100 transmits a Movement Notification (MVN) message and Ω, which contains the unique temporary address to the PAR that manages the subnetwork of the mobile terminal 100 (S1120). The MVN message informs the PAR of the movement of the mobile terminal 100.

Upon receiving the MVN message and Ω (S1120), the PAR intercepts the packet intended for the previous temporary address of the mobile terminal 100 and starts tunneling to the new temporary address contained in Ω (S1130). After the tunneling, the PAR sends a MVAck message in response to the MVN message to the mobile terminal 100 (S140).

Upon the reception of the MVAck message, the mobile terminal 100 transmits Link Switch (LS) Trigger information from the layer 3 to the layer 2 (S1150).

Meanwhile, in operation S1120, if the mobile terminal 100 does not receive the MVAck message within 10 ms after sending the MVN message to the PAR managing the subnetwork of the mobile terminal 100, the mobile terminal 100 re-transmits the MVN message to the PAR. Even when the MVAck message is not received within 10 ms after the retransmission, the mobile terminal 100 transmits the LS Trigger information from the layer 3 to the layer 2 (S1150). Likewise, the LS Trigger information is transmitted from the layer 3 to the layer 2 (S1150) when the SNR detected from the serving AP currently communicating with the mobile terminal 100 falls below the third threshold THR_3. The third threshold THR_3 is under the first threshold THR_1 and the second threshold THR_2.

When the LS Trigger information is delivered from the layer 3 to the layer 2 (S1150), the mobile terminal 100 tries re-association to the selected target AP (S1160).

After the re-association is completed, Link_Up Trigger information is transmitted from the layer 2 to the layer 3 (S1170). Next, the mobile terminal 100 is configured using the RA message received from the previous subnetwork and the new temporary address contained in Ω (S1180). In further detail, the mobile terminal 100 processes the RA received from the previous subnetwork as if the RA was normally received from the new NAR connected to the target AP. The mobile terminal 100 allocates the new temporary address contained in Ω received in the previous network, to its interface.

Next, the mobile terminal 100 transmits a fast neighbor advertisement (FNA) message to a NAR connected to the target AP to inform a joining of the mobile terminal 100 to the new network (S1190).

The NAR receiving the FNA message transmits packets tunneled through the normal routing procedure, to the mobile terminal 100 (S1195). If the FNA message is received from the mobile terminal 100 while the NAR receives the packets tunneled by the PAR and buffers packets intended for the new temporary address contained in Ω, the buffered packets are delivered to the mobile terminal 100 (S1195). The NAR changes a proxy neighbor cache to a normal neighbor cache and stops the Ω defense.

Figure 12:
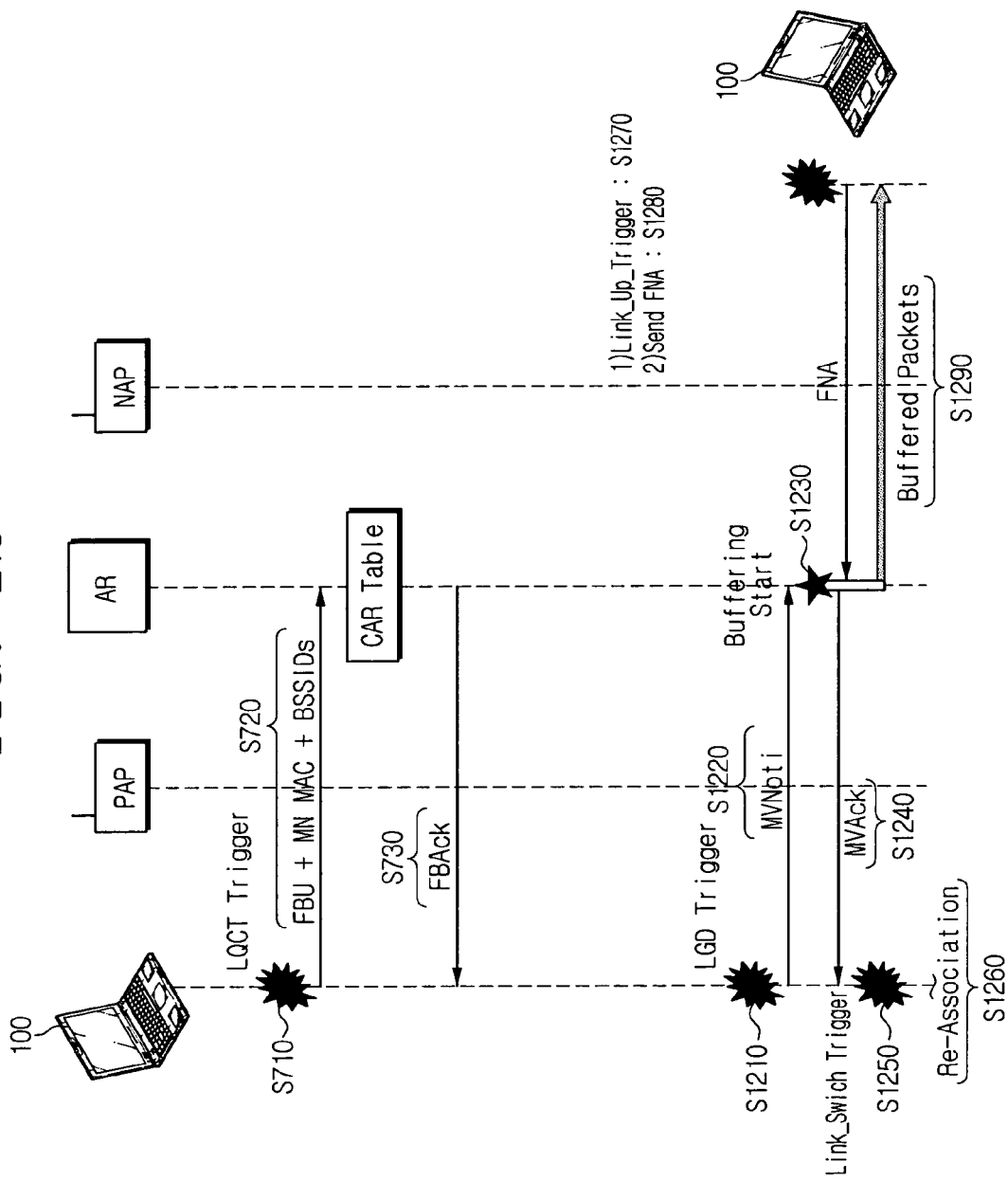
FIG. 12 is a flowchart explaining the handover action phase when the mobile terminal communicates with a target AP that belongs to the same subnetwork.

FIG. 12 is a flowchart explaining the handover action phase when the mobile terminal 100 communicates with a target AP that belongs to the same subnetwork. Operations S710 through S730 in FIG. 12 are performed at the handover ready phase and thus are not illustrated for the brevity.

Referring to FIG. 12, when the SNR detected from the serving AP currently communicating with the mobile terminal 100 falls below the second threshold THR_2, the LGD Trigger information is transmitted from the layer 2 to the layer 3 (S1210). The mobile terminal 100 sends the MVN message to its AR (S1220). The AR receiving the MVN message starts the buffering (S1230) and sends the MVAck message to the mobile terminal 100 in response to the MVN message (S1240). Upon receiving the MVAck message, the mobile terminal 100 immediately transmits the LS Trigger information from the layer 3 to the layer 2 (S1250). In operation S1220, if the mobile-terminal 100 does not receive the MVAck message within 10 ms after transmitting the MVN message to the AR that manages the subnetwork of the mobile terminal 100, the mobile terminal 100 retransmits the MVN message to the AR. Even when the MVAck message is not received within 10 ms after the retransmission, the mobile terminal 100 transmits the LS Trigger information from the layer 3 to the layer 2 (S1250). Likewise, when the SNR detected from the serving AP currently communicating with the mobile terminal 100 falls below the third threshold THR_3, the LS Trigger information is transmitted from the layer 3 to the layer 2 (S1250). The third threshold THR_3 is under the first threshold THR_1 and the second threshold THR_2.

After the LS Trigger information is transmitted from the layer 3 to the layer 2 (S1250), the mobile terminal 100 tries the re-association to the selected target AP (S1260).

Upon the completion of the re-association, Link_Up Trigger information is delivered from the layer 2 to the layer 3 (S1270). Next, the mobile terminal 100 transmits the FNA message to the AR (S1280). The AR receiving the FNA message forwards the buffered packets to the mobile terminal (S1290). Consequently, the fast handover optimized for the IEEE 802.11 networks can be carried out. The fast handover method has been illustrated aiming at the IEEE 802.11 networks in this embodiment, but not limited to these networks.

It should be understood that the fast handover method is applicable to other IEEE 802.1x networks.

As set forth above, as the movement prediction and the duplication address detection are conducted in the single process, the fast handover may be achieved.

Comparing with the related art, the packet loss may be prevented since the handover in the layer 2 is synchronized with the packet tunneling.

Furthermore, the locking operation is executed for a predetermined time starting from the transmission of the FBU message to the candidate APs and the target AP without having to consider the new candidate APs discovered when the mobile terminal makes abrupt changes to a movement path of the mobile terminal. Thus, the handover error may be avoided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fast handover method for a mobile terminal in a wireless local area system including the mobile terminal and a plurality of wireless access points (APs), of which one is a serving AP currently communicating with the mobile terminal and others represent neighbor APs of the mobile terminal, that communicate with the mobile terminal over a unique radio channel, the method comprising:

receiving a beacon frame signal from the serving AP and the neighbor APs of the mobile terminal;

generating a first signal to determine a state of each of the neighbor APs based on the beacon frame signal received from each of the neighbor APs;

comparing the first signal with predefined thresholds, classifying the neighbor APs into a detected AP, a candidate AP, and a target AP according to a result of the comparison, and storing the classification result in a neighbor AP list; and selecting an AP for the handover based on the classification result in the neighbor AP list.

2. The fast handover method of claim 1, wherein the beacon frame signal is received from the APs to the mobile terminal at intervals.

3. The fast handover method of claim 1, wherein the beacon frame signal is received from the APs to the mobile terminal when the mobile terminal requests the beacon frame signal.

4. The fast handover method of claim 1, wherein the first signal is one of signal-to-noise ratio (SNR), received signal strength indication (RSSI), bit error rate (BER), and packet error rate (PER).

5. The fast handover method of claim 4, wherein, when the first signal is the SNR, the SNR is processed to generate a Smoothed SNR, the generated Smoothed SNR is compared with predefined thresholds, and the neighbor APs are classified into a detected AP, a candidate AP, and a target AP according to the comparison.

6. The fast handover method of claim 5, wherein the Smoothed SNR is obtained from the equation:

$$\text{Smoothed SNR} = K \times \text{SNR}_c + (1-K) \text{SNR}_p,$$

where K is a variable, $\text{SNR}_c$ is a SNR measured at a current time, and $\text{SNR}_p$ is a SNR measured at a previous period time.

7. The fast handover method of claim 1, wherein
the predefined thresholds include a first threshold THR_1, a second threshold THR_2, and a third threshold THR_3, and
the first threshold THR_1 is greater than the second threshold THR_2, and the second threshold THR_2 is greater than the third threshold THR_3.

8. The fast handover method of claim 1, wherein the candidate AP and the target AP establish new communications with the mobile terminal.

9. The fast handover method of claim 7, wherein the neighbor AP is determined to be in the detected AP state when the first signal is initially detected from the neighbor APs and a strength of the first signal detected from the neighbor APs is below the second threshold THR_2.

10. The fast handover method of claim 9, wherein, when the neighbor AP maintains the detected AP state when the mobile terminal does not receive the beacon frame signal from the neighbor AP more than at least one time within 100 ms intervals while the neighbor AP is in the detected AP state.

11. The fast handover method of claim 9, wherein the neighbor AP is deleted from the neighbor AP list when the mobile terminal does not receive the beacon frame signal from the neighbor AP more than at least one time within 300 ms while the detected AP is in the detected AP state.

12. The fast handover method of claim 9, wherein the neighbor AP is changed from the detected AP state to a first candidate AP state when the strength of the first signal detected from the neighbor AP exceeds the second threshold THR_2 while the neighbor AP is in the detected AP state.

13. The fast handover method of claim 12, wherein the neighbor AP is changed from the first candidate AP to the target AP state when the strength of the first signal detected from the neighbor AP exceeds a strength of the first signal detected from the other neighbor APs of the mobile terminal while the neighbor AP is in the first candidate AP state.

14. The fast handover method of claim 12, wherein the neighbor AP is changed from the first candidate AP state to the detected AP state when the strength of the first signal detected from the neighbor AP falls below the second threshold THR_2 while the neighbor AP is in the first candidate AP state.

15. The fast handover method of claim 13, wherein the neighbor AP is changed from the target AP state to a second candidate AP state when the strength of the first signal detected from the neighbor AP falls below the strength of the first signal detected from the other neighbor APs of the mobile terminal while the neighbor AP is in the target AP state.

16. The fast handover method of claim 13, wherein the neighbor AP is changed from the target AP state to the second candidate AP state when the mobile terminal does not receive the beacon frame signal from the neighbor AP more than at least one time within 100 ms intervals while the neighbor AP is in the target AP state.

17. The fast handover method of claim 15, wherein the neighbor AP is changed from the second candidate AP state to the detected AP state when the strength of the first signal detected from the neighbor AP falls below the first threshold THR_1 while the neighbor AP is in the second candidate AP state.

18. The fast handover method of claim 15, wherein the neighbor AP is changed from the second candidate AP state to the detected AP state when the mobile terminal does not receive the beacon frame signal from the neighbor AP more than at least one time within 100 ms intervals while the neighbor AP is in the second candidate AP state.

19. The fast handover method of claim 18, wherein the neighbor AP is changed from the detected AP state to the second candidate AP state when the strength of the first signal detected from the neighbor AP exceeds the first threshold THR_1 while the neighbor AP is in the detected AP state.

20. The fast handover method of claim 7, wherein a handover ready phase commences when a strength of a first signal detected from the serving AP falls below the first threshold THR_1.

21. The fast handover method of claim 20, wherein the handover ready phase occurs when the serving AP currently communicating with the mobile terminal and the neighbor AP that establishes new communications with the mobile terminal belong to different subnetworks, or when the serving AP currently communicating with the mobile terminal and the neighbor AP that establishes new communications with the mobile terminal belong to the same subnetwork.

22. The fast handover method of claim 20, wherein the handover ready phase comprises:
 (a) transmitting Link_Quality_Crosses_Threshold (LQCT) Trigger information from a layer 2 to a layer 3;
 (b) selecting a candidate AP and a target AP, which are each neighbor APs that are capable of establishing new communications with the mobile terminal, from among the neighbor AP list, and retrieving information relating to the selected candidate AP and target AP;
 (c) transmitting a media access control (MAC) address of the mobile terminal, basic service set identifiers (BSSIDs) of the candidate APs and the target AP, and a fast binding update (FBU) message from the mobile terminal to an access router that manages the subnetwork the mobile terminal belongs to when the neighbor AP capable of establishing new communications with the mobile terminal and the serving AP currently communicating with the mobile terminal belong to different subnetworks according to the information retrieval;
 (d) transmitting a handover initiation (HI) message and the MAC address of the mobile terminal from the access router that manages the subnetwork of the mobile terminal, to routers connected to the candidate APs and the target AP, respectively;
 (e) transmitting a handover acknowledgement (Hack) message in response to the HI message, a router advertisement (RA) message, and Ω, which has an ensured unique temporary address, from the routers connected to the candidate APs and the target AP, to the access router managing the subnetwork of the mobile terminal; and
 (f) combining the RA message and the Ω that are received from the routers connected to the candidate APs and the target AP, and transmitting the combined message to the mobile terminal together with a fast binding acknowledgement (FBAck) message.

23. The fast handover method of claim 22, wherein, following the (c) operation, a locking operation is performed to prevent an addition of a new candidate AP into the neighbor AP list even when the new candidate AP is discovered among the neighbor APs of the mobile terminal.

24. The fast handover method of claim 23, further comprising inserting newly discovered candidate APs into a waiting queue.

25. The fast handover method of claim 22, wherein the (d) operation comprises checking new access routers (NARs) that are connected to the target AP and the candidate APs based on the BSSIDs of the candidate APs and the target AP obtained from a CAR table.

26. The fast handover method of claim 22, wherein the BSSIDs of the candidate APs and the target AP contain MAC address information relating to the candidate APs and the target AP.

27. The fast handover method of claim 22, wherein completion of the (f) operation comprises:
 signaling that the handover ready phase is completed, and operating a timer for a predetermined time starting from the completion of the handover ready phase.

28. The fast handover method of claim 27, wherein the predetermined time is approximately 3 seconds.

29. The fast handover method of claim 27, wherein the mobile terminal enters a handover action phase when the strength of the first signal falls below the first threshold THR_2 detected from the serving AP within the predetermined time.

30. The fast handover method of claim 29, wherein, when the mobile terminal enters the handover action phase, the locking operation for the candidate APs is terminated and a target AP is re-selected from the candidate APs.

31. The fast handover method of claim 27, wherein the handover ready phase is re-preformed after the predetermined time when the strength of the first signal detected from the serving AP lies between the first threshold THR_1 and the second threshold THR_2 within the predetermined time.

32. The fast handover method of claim 31, wherein the candidate APs that are inserted into the waiting queue are updated to the neighbor AP list, and a target AP is selected from the candidate APs of the updated neighbor AP list when the handover ready phase is re-performed.

33. The fast handover method of claim 27, wherein initialization is performed to delete all of the candidate APs and the target AP from the neighbor AP list when the strength of the first signal detected from the serving AP exceeds the first threshold THR_1 within the predetermined time.

34. The fast handover method of claim 29, wherein the handover action phase comprises:
 (a) transmitting Link_GoingDown (LGD) Trigger information from the layer 2 to the layer 3;
 (b) transmitting a movement notification (MVN) message and an Ω, which includes a unique temporary address, from the mobile terminal to the access router that manages the subnetwork of the mobile terminal; and
 (c) tunneling by the access router that manages the subnetwork of the mobile terminal, ad transmitting a MVAck message in response to the MVN message from the access router to the mobile terminal.

35. The fast handover method of claim 34, wherein the MVN message informs the access router of information indicating the movement of the mobile terminal.

36. The fast handover method of claim 34, wherein the (c) operation intercepts, packets intended for a previous temporary address of the mobile terminal at the access routers and tunnels the intercepted packets to a new temporary address contained in the Ω.

37. The fast handover method of claim 34, wherein the (c) operation transmits Link_Switch (LS) Trigger information from the layer 3 to the layer 2 when the MVAck message is received at the mobile terminal.

38. The fast handover method of claim 34, wherein the LS Trigger information is transmitted from the layer 3 to the layer 2 when the strength of the first signal detected from the serving AP falls below the third threshold THR_3.

39. The fast handover method of claim 34, further comprising, following the transmission of the MVN message in the (b) operation:

retransmitting the MVN message when the mobile terminal does not receive the MVAck message from the access router within approximately 10 ms; and transmitting the LS Trigger information from the layer 3 to the layer 2 when the MVAck message is not received within 10 ms after retransmitting the MVN message.

40. The fast handover method of claim 37, further comprising, following the transmission of the LS Trigger information from the layer 3 to the layer 2:

trying a re-association to the target AP selected from the candidate APs of the neighbor AP list;

transmitting Link_Up Trigger information from the layer 2 to the layer 3 when the re-association is completed;

configuring the mobile terminal using the RA message and the new temporary address contained in the Ω that are obtained from a previous subnetwork;

transmitting a fast neighbor advertisement (FNA) message from the mobile terminal to the access router connected to the target AP; and transmitting the packets tunneled by routing at the access router that receives the FNA message, to the mobile terminal.

41. The fast handover method of claim 40, wherein the buffered packets are delivered to the mobile terminal when the FNA message from the mobile terminal is received while the access router connected to the target AP first receives the packets tunneled at the PAR and buffers the packets intended for the new temporary address contained in Ω.

42. The fast handover method of claim 20, wherein the handover ready phase comprises:

(a) transmitting the LQCT Trigger information from the layer 2 to the layer 3;

(b) selecting a candidate AP and a target AP that are neighbor APs capable of establishing new communications with the mobile terminal from the neighbor AP list, and retrieving information relating to the selected candidate AP and target AP;

(c) transmitting the MAC address of the mobile terminal, the BSSIDs of the candidate APs and the target AP, and the FBU message from the mobile terminal to the access router that manages the subnetwork of the mobile terminal when the neighbor AP capable of establishing new communications with the mobile terminal belongs to the same subnetwork as the mobile terminal according to the information retrieval; and (d) transmitting a FBAck message in response to the FBU message from the access router managing the subnetwork of the mobile terminal to the mobile terminal.

43. The fast handover method of claim 42, wherein, following the (c) operation, a locking operation is performed not allowing to add a new candidate AP into the neighbor AP list even when the new candidate AP is discovered among the neighbor APs of the mobile terminal.

44. The fast handover method of claim 43, wherein candidate APs newly discovered are inserted into the waiting queue.

45. The fast handover method of claim 42, wherein the BSSIDs of the candidate APs and the target AP contain MAC address information of the candidate APs and the target AP.

46. The fast handover method of claim 42, wherein completion of the (d) operation comprises:

signaling the completion of the handover ready phase, and operating a timer for a predetermined time starting from the completion of the handover ready phase.

47. The fast handover method of claim 46, wherein the predetermined time is approximately 3 seconds.

48. The fast handover method of claim 46, wherein the mobile terminal enters the handover action phase when the strength of the first signal detected from the serving AP falls below the second threshold THR_2 within the predetermined time.

49. The fast handover method of claim 48, wherein, when the mobile terminal enters the handover action phase, the locking operation for the candidate APs is terminated and a target AP is re-selected from the candidate APs.

50. The fast handover method of claim 46, wherein the handover ready phase is re-preformed after the predetermined time when the strength of the first signal detected from the serving AP lies between the first threshold THR_1 and the second threshold THR_2 within the predetermined time.

51. The fast handover method of claim 50, wherein the candidate APs inserted into the waiting queue are updated to the neighbor AP list, and a target AP is selected from the candidate APs of the updated neighbor AP list when the handover ready phase is re-performed.

52. The fast handover method of claim 46, further comprising performing initialization to delete all of the candidate APs and the target AP from the neighbor AP list when the strength of the first signal detected from the serving AP exceeds the first threshold THR_1 within the predetermined time.

53. The fast handover method of claim 48, wherein the handover action phase comprises:

(a) transmitting LGD Trigger information from the layer 2 to the layer 3;

(b) transmitting a MVN message from the mobile terminal to the access router that manages the subnetwork of the mobile terminal; and (c) buffering by the access router that manages the subnetwork of the mobile terminal, ad transmitting a MVAck message in response to the MVN message from the access router to the mobile terminal.

54. The fast handover method of claim 53, wherein the MVN message informs the access router of information indicating the movement of the mobile terminal.

55. The fast handover method of claim 53, wherein the (c) operation transmits LS Trigger information from the layer 3 to the layer 2 when the MVAck message is received at the mobile terminal.

56. The fast handover method of claim 53, wherein the LS Trigger information is transmitted from the layer 3 to the layer 2 when the strength of the first signal detected from the serving AP falls below the third threshold THR_3.

57. The fast handover method of claim 53, further comprising, following the transmission of the MVN message in the (b) operation:

retransmitting the MVN message when the mobile terminal does not receive the MVAck message from the access router within approximately 10 ms; and transmitting the LS Trigger information from the layer 3 to the layer 2 when the MVAck message is not received within 10 ms after retransmitting the MVN message.

58. The fast handover method of claim 55, further comprising:

trying a re-association to the target AP selected from the candidate APs when the LS Trigger information is transmitted from the layer 3 to the layer 2;

transmitting Link_Up Trigger information from the layer 2 to the layer 3 when the re-association is completed;

transmitting a FNA message from the mobile terminal to the access router connected to the target AP; and transmitting the buffered packets from the access router connected to the target AP to the mobile terminal.

59. A mobile apparatus including a memory to employ a fast handover method from an access point (AP) to another AP that is optimized for the Institute of Electrical and Electronics Engineers (IEEE) 802.11 networks, comprising:
- a transceiver to receive and transmit a signal to and from a serving AP that currently communicates with the mobile apparatus and to receive beacon frame signals transmitted from neighbor APs of the mobile apparatus;
- a signal processor to which the received signal and beacon frame signal are provided to process the signal of the serving AP and to process a parameter contained in each beacon frame signal;
- a comparator to compare the parameter of each beacon frame signal with pre-stored thresholds in the memory;
- a neighbor AP list manager to prioritize the neighbor APs in a list based on the comparison;
- a timer to judge a timing of each beacon frame signal so as to signal the neighbor list manager to delete a neighbor AP from the list based on the judgments; and
- a controller to determine if the serving AP signal is normal, and, if not, to commence a handover of communications to an undeleted highly prioritized neighbor AP.

60. The mobile apparatus according to claim 59, wherein the transceiver comprises a first transceiver communicates with the serving AP according to IEEE 802.11 standards.

61. The mobile apparatus according to claim 59, wherein the beacon frame signal is transmitted at 100 ms intervals.

62. The mobile apparatus according to claim 59, wherein the transceiver comprises a second receiver which itself comprises a scouter module, such that the second receiver is able to operate in an active mode to scan neighbor APs and an idle mode to suspend the scanning.

63. The mobile apparatus according to claim 59, wherein the signal processor comprises first and second signal processors to process a parameter contained in the beacon frame signal.

64. The mobile apparatus according to claim 59, wherein the parameter may be signal-to-noise ratio (SNR), received signal strength indication (RSSI), bit error rate (BER), and/or packet error rate (PER) or a combination thereof.

65. The mobile apparatus according to claim 64, wherein the first and second signal processors process the SNR contained in the beacon frame signal and obtain Smoothed SNR.

66. The mobile apparatus according to claim 59, wherein the neighbor AP list manager prioritizes the neighbor APs by classifying the neighbor APs into a detected AP, a candidate AP, and a target AP based on the comparison result received from the comparator.

67. The mobile apparatus according to claim 66, wherein, if the detected AP is switched to the candidate AP or if the candidate AP is switched to the target AP, the neighbor AP list manager updates the neighbor AP list.

68. The mobile apparatus according to claim 67, wherein the detected AP is an AP of which a signal alone is detected without an ensured quality of the radio channel, the candidate AP has a guaranteed quality of some degree, and the target AP has the largest value of the signal detected from among the neighbor APs.

69. The mobile apparatus according to claim 59, wherein the timer comprises a plurality of timers that correspond to the neighbor APs, such that the respective timers count beacon frame signal timing from the time when the beacon frame signal is received with 100 ms intervals.

70. The mobile apparatus according to claim 69, wherein when the beacon frame signal is not received from a neighbor AP with 100 ms intervals, the timer informs the neighbor AP list manager that the beacon frame signal is not received.

71. The mobile apparatus according to claim 70, wherein if the beacon frame signal is not received from a neighbor AP, the timer informs the neighbor AP list manager that the beacon frame signal is not received from a neighbor AP, and the neighbor AP list manager deletes the neighbor AP from the neighbor AP list.

72. The mobile apparatus according to claim 59, wherein if the serving AP signal is normal, the controller continues to receive data from the serving AP.

73. The mobile apparatus according to claim 72, wherein, when a signal to noise ratio (SNR) of the serving AP signal falls below a predefined first threshold THR_1 the controller controls the mobile apparatus to enter a handover ready phase.

74. The mobile apparatus according to claim 73, wherein, when the SNR of the serving AP signal falls below a predefined second threshold THR_2, the controller controls the mobile apparatus to be handed over.

75. The mobile apparatus according to claim 74, wherein, when the SNR of the serving AP signal falls below a predefined third threshold THR_3, the controller interrupts the communications between the mobile apparatus and the serving AP.

76. The mobile apparatus according to claim 75, wherein the controller reconnects the serving AP to the mobile apparatus.

77. A mobile apparatus including a memory to employ a fast handover method from an access point (AP) to another AP that is optimized for the Institute of Electrical and Electronics Engineers (IEEE) 802.11 networks, comprising:
- a transceiver to receive and transmit a signal to and from a serving AP that currently communicates with the mobile apparatus and to receive beacon frame signals transmitted from neighbor APs of the mobile apparatus;
- a signal processor to which the received signal and beacon frame signal are provided to process the signal of the serving AP and to process a parameter contained in each beacon frame signal;
- a comparator to compare the parameter of each beacon frame signal with pre-stored thresholds in the memory;
- a neighbor AP manager to prioritize the neighbor APs based on the comparison; and
- a controller to determine if the serving AP signal is normal, and, if not, to commence a handover of communications to a highly prioritized neighbor AP.

78. A mobile apparatus including a memory to employ a fast handover method from an access point (AP) to another AP, comprising:
- a transceiver to receive and transmit a signal to and from a serving AP that currently communicates with the mobile apparatus and to receive beacon frame signals transmitted from neighbor APs of the mobile apparatus;
- a signal processor to which the received signal and beacon frame signal are provided to process the signal of the serving AP and to process a parameter contained in each beacon frame signal;
- a comparator to compare the parameter of each beacon frame signal with pre-stored thresholds in the memory;
- a neighbor AP list manager to prioritize the neighbor APs in a list based on the comparison;
- a timer to judge a timing of each beacon frame signal so as to signal the neighbor list manager to delete a neighbor AP from the list based on the judgments; and
- a controller to determine if the serving AP signal is normal, and, if not, to commence a handover of communications to an undeleted highly prioritized neighbor AP.

79. A mobile apparatus including a memory to employ a fast handover method from an access point (AP) to another AP, comprising:
- a transceiver to receive and transmit a signal to and from a serving AP that currently communicates with the mobile apparatus and to receive beacon frame signals transmitted from neighbor APs of the mobile apparatus;
- a signal processor to which the received signal and beacon frame signal are provided to process the signal of the serving AP and to process a parameter contained in each beacon frame signal;
- a comparator to compare the parameter of each beacon frame signal with pre-stored thresholds in the memory;
- a neighbor AP manager to prioritize the neighbor APs based on the comparison; and
- a controller to determine if the serving AP signal is normal, and, if not, to commence a handover of communications to a highly prioritized neighbor AP.

* * * * *